United States Patent
Esenlik et al.

(10) Patent No.: US 12,470,742 B2
(45) Date of Patent: *Nov. 11, 2025

(54) ENCODER, A DECODER AND CORRESPONDING METHODS FOR INTER-PREDICTION

(71) Applicant: HUAWEI TECHNOLOGIES CO., LTD., Guangdong (CN)

(72) Inventors: Semih Esenlik, Munich (DE); Han Gao, Shenzhen (CN); Anand Meher Kotra, Munich (DE); Biao Wang, Shenzhen (CN); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,902

(22) Filed: Jul. 21, 2023

(65) Prior Publication Data

US 2024/0031598 A1 Jan. 25, 2024

Related U.S. Application Data

(63) Continuation of application No. 17/713,223, filed on Apr. 4, 2022, now Pat. No. 11,736,719, which is a
(Continued)

(51) Int. Cl.
*H04N 19/56* (2014.01)
*H04N 19/57* (2014.01)
*H04N 19/61* (2014.01)

(52) U.S. Cl.
CPC .............. *H04N 19/56* (2014.11); *H04N 19/57* (2014.11); *H04N 19/61* (2014.11)

(58) Field of Classification Search
CPC .......... H04N 19/57; H04N 19/56; H04N 19/61
See application file for complete search history.

(56) References Cited

U.S. PATENT DOCUMENTS

| 11,336,916 B2 * | 5/2022 | Esenlik ................ H04N 19/577 |
| 11,736,719 B2 * | 8/2023 | Esenlik ................ H04N 19/577 375/240.16 |

(Continued)

FOREIGN PATENT DOCUMENTS

| CN | 1787642 A | 6/2006 |
| CN | 101815218 A | 8/2010 |

(Continued)

OTHER PUBLICATIONS

Document: JVET-D0029, Xu Chen et al, Decoder-Side Motion Vector Refinement Based on Bilateral Template Matching, Joint Video Exploration Team (JVET) of ITU-T SG 16 WP 3 and ISO/IEC JTC 1/SC 29/WG 11, 4th Meeting: Chengdu, CN, Oct. 15-21, 2016, total 4 pages.

(Continued)

*Primary Examiner* — Thai Q Tran
(74) *Attorney, Agent, or Firm* — WOMBLE BOND DICKINSON (US) LLP

(57) ABSTRACT

A non-transitory computer-readable medium for inter-prediction and an encoder are provided. An initial motion vector is obtained for a current block. Search space positions are determined according to the initial motion vector. Matching costs for the search space positions are checked according to a checking order to select a target search space position with a minimal matching cost. A refining motion vector of the current block is determined based on the initial motion vector and the target search space position. A central search
(Continued)

space position is determined according to the checking order, and the central search space position is pointed to by the initial motion vector.

13 Claims, 11 Drawing Sheets

Related U.S. Application Data continuation of application No. 17/317,711, filed on May 11, 2021, now Pat. No. 11,336,916, which is a continuation of application No. PCT/CN2019/126977, filed on Dec. 20, 2019.

(60) Provisional application No. 62/812,190, filed on Feb. 28, 2019.

(56) References Cited

U.S. PATENT DOCUMENTS

| | | | |
|---|---|---|---|
| 2005/0141615 A1 | 6/2005 | Kim | |
| 2010/0290530 A1 | 11/2010 | Huang et al. | |
| 2011/0170596 A1* | 7/2011 | Shi | H04N 19/59 375/240.16 |
| 2011/0170597 A1 | 7/2011 | Shi et al. | |
| 2013/0016773 A1* | 1/2013 | Oh | H04N 19/18 375/240.03 |
| 2014/0205013 A1 | 7/2014 | Kim et al. | |
| 2014/0269919 A1 | 9/2014 | Rodriguez | |
| 2016/0286232 A1 | 9/2016 | Li et al. | |
| 2018/0040133 A1 | 2/2018 | Srinivasan et al. | |
| 2018/0278949 A1 | 9/2018 | Karczewicz et al. | |
| 2018/0338154 A1* | 11/2018 | Huang | H04N 19/56 |
| 2019/0007699 A1 | 1/2019 | Liu et al. | |
| 2020/0045325 A1* | 2/2020 | Xu | H04N 19/20 |
| 2020/0092545 A1* | 3/2020 | Xu | H04N 19/132 |
| 2020/0137415 A1* | 4/2020 | Esenlik | H04N 19/521 |
| 2021/0021812 A1* | 1/2021 | Zheng | H04N 19/119 |
| 2021/0076059 A1 | 3/2021 | Sethuraman et al. | |
| 2021/0274216 A1 | 9/2021 | Esenlik et al. | |

FOREIGN PATENT DOCUMENTS

| | | |
|---|---|---|
| CN | 105282557 A | 1/2016 |
| CN | 106537918 A | 3/2017 |
| CN | 108134939 A | 6/2018 |
| CN | 108419082 A | 8/2018 |
| CN | 109218733 A | 1/2019 |
| EP | 3547687 A2 | 10/2019 |
| EP | 3595313 A1 | 1/2020 |
| JP | 2005260392 A | 9/2005 |
| JP | 2011061302 A | 3/2011 |
| KR | 20140051026 A | 4/2014 |
| WO | 2018002024 A1 | 1/2018 |
| WO | 2018097693 A2 | 5/2018 |
| WO | 2018163858 A1 | 9/2018 |
| WO | 2019001785 A1 | 1/2019 |

OTHER PUBLICATIONS

Richardson Iain E G: "Video Codec Design; Ch. 6—Motion estimationand compensation, p. 93-126", Video Codec Design, Jun. 25, 2002(Jun. 25, 2002), pp. 93-126, XP002335508,DOI: 10.1002/0470847832.CH6.

Yoshinori Owaki, et al. Acceleration of Block Matching Using Square Error as Criteria , Institute of Image Information and Television Engineers Technical Report, vol. 23, No. 79, Institute of Image Information and Television Engineers, Dec. 16, 1999, pp. 7-12, ISSN: 1342-6893 (Citation showing well-known technology).

Document: JVET-J0057, Xu Chen et al, DMVR extension based on template matching, Joint Video Exploration Team (JVET) of ITU-T SG 16 WP 3 and ISO/IEC JTC 1/SC 29/WG 11, 10th Meeting: San Diego, US, Apr. 10-20, 2018, 10 pages.

ITU-T H.264(Apr. 2017), Series H: Audiovisual and Multimedia Systems, Infrastructure of audiovisual services—Coding of moving video, Advanced video coding for generic audiovisual services, total 812 pages.

Yu L et al: "Hierarchical Motion Estimation Algorithmswith Especially Low Hardware Costs", IEEE Transactionson Consumer Electronics, IEEE Service Center, New York, NY, US, vol. 44, No. 1, Feb. 1, 1998 (Feb. 1, 1998), pp. 125-129,XP000779258, ISSN: 0098-3063, DOI: 10.1109/30.6.

Sakae Okubo, Impress Standard Textbook Series H.265/HEVC Textbook , First Edition, Oct. 21, 2013, Impress Japan, pp. 245-248, ISBN: 978-4-8443-3468-2. (Citation showing well-known technology).

Steffen Kamp et al, Decoder-Side Motion Vector Derivation for Block-Based Video Coding, IEEE Transactions on Circuits and Systems for Video Technology, vol. 22, No. 12, Dec. 2012, 19 pages.

ITU-T H.265(Feb. 2018), Series H: Audiovisual and Multimedia Systems Infrastructure of audiovisual services—Coding of moving video, High efficiency video coding, total 692 pages.

Charalampos Konstantopoulos et al, Hierarchical Block Matching Motion Estimationon a Hypercube Multiprocessor, 1999, 11 pages.

Akihiro Sato, et al. Acceleration method of motion vector detection processing using vector prediction by Newton interpolation method , Information Processing Society of Japan Research Report, vol. 2005, No. 18, Information Processing Society of Japan, Mar. 4, 2005, pp. 243-250, ISSN: 0919-6072. (Citation showing well-known technology).

Wien Mathias: "Chapter 7: Inter Prediction" In: "High Efficiency Video Coding—Coding Tools and Specification", Oct. 8, 2014 (Oct. 8, 2014), Springer-Verlag, Berlin Heidelberg, XP093030080, ISBN: 3662442752 pp. 179-203, DOI: 10.1007/978-3-662-44276-0.

Iain E. G. Richardson, Motion Estimation and Compensation, Video Codec Design: DevelopingImage and Video Compression Systems (Jun. 30, 2002).

\* cited by examiner

ENCODER, A DECODER AND CORRESPONDING METHODS FOR INTER-PREDICTION

CROSS-REFERENCE TO RELATED APPLICATIONS

This application is a continuation of U.S. patent application Ser. No. 17/713,223 filed on Apr. 4, 2022, which is a continuation of U.S. patent application Ser. No. 17/317,711 filed on May 11, 2021, now U.S. Pat. No. 11,336,916, which is a continuation of International Application No. PCT/CN2019/126977 filed on Dec. 20, 2019, which claims priority to U.S. Provisional Patent Application No. 62/812,190 filed on Feb. 28, 2019. All of the aforementioned patent applications are hereby incorporated by reference in their entireties.

TECHNICAL FIELD

Embodiments of the present application generally relate to the field of picture (image) processing and more particularly to inter-prediction.

BACKGROUND

Video coding (video encoding and decoding) is used in a wide range of digital video applications, for example broadcast digital TV, video transmission over internet and mobile networks, real-time conversational applications such as video chat and video conferencing, data storage and decoding media such as DVD and Blu-ray discs, and video content acquisition and editing systems such as those associated with digital video recorders commonly utilized in security applications.

The amount of video data needed to depict even a relatively short video might be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. Compressed data that is transmitted is received at the destination by a video decompression device that decodes the video data. With limited network resources and ever-increasing demands of higher video quality, improved compression and decompression techniques that improve compression ratio with little to no sacrifice in picture quality are desirable.

SUMMARY

A scheme is provided for constructing a search space for motion vector refinement.

In a first aspect, an inter-prediction method comprises obtaining an initial motion vector for a current block; determining search space positions according to the initial motion vector; checking matching costs of the search space positions according to a checking order to select a target search space position with a minimal matching cost; and determining a refining motion vector of the current block based on the initial motion vector and the target search space position, wherein a central search space position is checked first according to the checking order, and wherein the central search space position is pointed to by the initial motion vector.

In an implementation, search space positions comprise the central search positions and neighboring search space positions, wherein determining search space positions according to the initial motion vector, comprises determining the central search space position according to the initial motion vector; and determining the neighboring search space positions according to one or more preset offsets and the central search space position.

In an implementation, a search space consists of the search space positions, and a pattern of the search space is a 5×5 search space position square.

In an implementation, checking matching costs of the search space positions according to the checking order to select a target search space position with a minimal matching cost, comprises checking a matching cost of each of the search space positions in turn according to the checking order; and selecting a search space position with the minimal matching cost among the search space positions as the target search space position.

In an implementation, checking the matching cost of each of the search space positions in turn according to the checking order comprises comparing a matching cost of one of the search space positions with a temporary (temp) minimal matching cost; setting the matching cost of the one of the search space positions as the temp minimal matching cost when the matching cost of the one of the search space positions is smaller than the temp minimal matching cost; and setting the temp minimal matching cost as the minimal matching cost after the last one of the search space positions is checked.

In an implementation, the central search space position is set as (0, 0) of a coordinate system, horizontal right is set as a horizontal positive direction and vertical down is set as a vertical positive direction.

In an implementation, the checking order is (0, 0), (−2, −2), (−1, −2), (0, −2), (1, −2), (2, −2), (−2, −1), (−1, −1), (0, −1), (1, −1), (2, −1), (−2, 0), (−1, 0), (1, 0), (2, 0), (−2, 1), (−1, 1), (0, 1), (1, 1), (2, 1), (−2, 2), (−1, 2), (0, 2), (1, 2), (2, 2).

In an implementation, the checking order is (0, 0), (−1, 0), (0, 1), (1, 0), (0, −1), (−1, −1), (−1, 1), (1, 1), (1, −1), (−2, 0), (−2, 1), (−2, 2), (−1, 2), (0, 2), (1, 2), (2, 2), (2, 1), (2, 0), (2, −1), (2, −2), (1, −2), (0, −2), (−1, −2), (−2, −2), (−2, −1).

In an implementation, the checking order is (0, 0), (−1, 0), (0, 1), (1, 0), (0, −1), (−1, −1), (−1, 1), (1, 1), (1, −1), (−2, 0), (0, 2), (2, 0), (0, −2), (−2, −1), (−2, 1), (−2, 2), (−1, 2), (1, 2), (2, 2), (2, 1), (2, −1), (2, −2), (1, −2), (−1, −2), (−2, −2).

In an implementation, the checking order is (0, 0), (−1, 0), (0, 1), (1, 0), (0, −1), (−1, −1), (−1, 1), (1, 1), (1, −1), (−2, 0), (0, 2), (2, 0), (0, −2), (−2, −2), (−2, 2), (2, 2), (2, −2), (−2, −1), (−2, 1), (−1, 2), (1, 2), (2, 1), (2, −1), (1, −2), (−1, −2).

In a second aspect, an inter-prediction apparatus comprises an obtaining module, configured to obtain an initial motion vector for a current block; a setting module, configured to determine search space positions according to the initial motion vector; a calculating module, configured to check matching costs of the search space positions according to a checking order to select a target search space position with a minimal matching cost; and a prediction module, configured to determine a refining motion vector of the current block based on the initial motion vector and the target search space position, wherein a central search space position is checked first according to the checking order, and wherein the central search space position is pointed to by the initial motion vector.

In an implementation, search space positions comprise the central search positions and neighboring search space positions, the setting module being configured to determine the central search space position according to the initial motion vector and to determine the neighboring search space positions according to one or more preset offsets and the central search space position.

In an implementation, a search space consists of the search space positions, and a pattern of the search space is a 5×5 search space position square.

In an implementation, the calculating module is configured to check a matching cost of each of the search space positions in turn according to the checking order and to select a search space position with the minimal matching cost among the search space positions as the target search space position.

In an implementation, the calculating module is configured to compare a matching cost of one of the search space positions with a temp minimal matching cost; set the matching cost of the one of the search space positions as the temp minimal matching cost when the matching cost of the one of the search space positions is smaller than the temp minimal matching cost; and
    set the temp minimal matching cost as the minimal matching cost after the last one of the search space positions is checked.

In an implementation, the central search space position is set as (0, 0) of a coordinate system, horizontal right is set as a horizontal positive direction and vertical down is set as a vertical positive direction.

In an implementation, the checking order is (0, 0), (−2, −2), (−1, −2), (0, −2), (1, −2), (2, −2), (−2, −1), (−1, −1), (0, −1), (1, −1), (2, −1), (−2, 0), (−1, 0), (1, 0), (2, 0), (−2, 1), (−1, 1), (0, 1), (1, 1), (2, 1), (−2, 2), (−1, 2), (0, 2), (1, 2), (2, 2).

In an implementation, the checking order is (0, 0), (−1, 0), (0, 1), (1, 0), (0, −1), (−1, −1), (−1, 1), (1, 1), (1, −1), (−2, 0), (−2, 1), (−2, 2), (−1, 2), (0, 2), (1, 2), (2, 2), (2, 1), (2, 0), (2, −1), (2, −2), (1, −2), (0, −2), (−1, −2), (−2, −2), (−2, −1).

In an implementation, the checking order is (0, 0), (−1, 0), (0, 1), (1, 0), (0, −1), (−1, −1), (−1, 1), (1, 1), (1, −1), (−2, 0), (0, 2), (2, 0), (0, −2), (−2, −1), (−2, 1), (−2, 2), (−1, 2), (1, 2), (2, 2), (2, 1), (2, −1), (2, −2), (1, −2), (−1, −2), (−2, −2).

In an implementation, the checking order is (0, 0), (−1, 0), (0, 1), (1, 0), (0, −1), (−1, −1), (−1, 1), (1, 1), (1, −1), (−2, 0), (0, 2), (2, 0), (0, −2), (−2, −2), (−2, 2), (2, 2), (2, −2), (−2, −1), (−2, 1), (−1, 2), (1, 2), (2, 1), (2, −1), (1, −2), (−1, −2).

In a third aspect, a method for determining a motion vector to be used in inter-prediction of a current block of a video picture (or frame). The method comprises obtaining an initial motion vector; obtaining at least two groups of points (in an example, one group of points may comprise only one point) according to the initial motion vector; obtaining the motion vector for the current block according to the at least two groups of points and a cost function.

In an implementation, the at least two group of points comprise all points that are inside a square, the square is centered at a point corresponding to the initial motion vector.

In an implementation, the at least two group of points comprise all points that are inside a square, corners of the square are determined by the coordinates (−2, −2), (2, 2), (−2, 2) and (2, −2).

In an implementation, a first group of points in the at least two groups of points comprises the center point that is pointed by the initial motion vector.

In an implementation, a second group of points in the at least two groups of points comprises four points that are left, top, right and bottom neighbors of the center point, the center point is pointed by the initial motion vector.

In an implementation, a third group of points in the at least two groups of points comprises four points that are 1 pixel sample away from the center point and that are not comprised in the second group.

In an implementation, a fourth group of points in the at least two groups of points comprises points that are 2 pixel samples away from the center point at least in one coordinate axis.

In an implementation, the at least two groups of points are processed orderly when the at least two groups of points are processed with the cost function.

In an implementation, a fourth group of points in the at least two groups of points comprises points that are 2 pixel samples away from the center point in one coordinate axis and 0 pixel samples away from the center point in the other coordinate axis.

In an implementation, a fifth group of points in the at least two groups of points comprises points that are 2 pixel samples away from the center point at least in one coordinate axis and that are not included in the fourth group of points.

In an implementation, a fifth group of points in the at least two groups of points comprises points that are 2 pixel samples away from the center point in both −x and −y coordinate axes.

In an implementation, a sixth group of points in the at least two groups of points comprises points that are 2 pixel samples away from the center point at least in one coordinate axis and that are not included in the fourth or the fifth group of points.

In an implementation, a fourth group of points in the at least two groups of points comprises points that are 2 pixel samples away from the center point only in one coordinate axis and 0 pixel samples away from the center point in the other coordinate axis.

In an implementation, when one group of points in the at least two groups of points comprises at least two points, the points of the group are ordered according to a predefined rule.

In an implementation, when one group of points in the at least two groups of points comprises at least two points, the leftmost point among the group of points is selected as the first point among the group of points.

In an implementation, when one group of points in the at least two groups of points comprises at least two points, and when there are more than one point that are leftmost points of the group of points, the point that is left-most of the group and that has a coordinate displacement that is closer to 0 in vertical direction (−y direction) is selected as the first point among the group of points.

In an implementation, when one group of points in the at least two groups of points comprises at least two points, and when there are more than one leftmost points in the group of points and if the points have same displacement in −y direction, then the left-most point in the top direction is selected as the first point of the group of points.

In an implementation, when one group of points in the at least two groups of points comprises at least two points, and after the first point in the group of points is determined, the remaining points in the same group are ordered based on clock-wise or counter-clockwise scanning of points around the center point.

In an implementation, the initial motion vector corresponds to a motion vector that is derived using an index signaled in the bitstream.

In an implementation, the initial and the obtained motion vector are not coded into the bitstream.

In a fourth aspect, a computer program product comprising program code for performing the method according to the first or third aspect when executed on a computer or a processor.

In a fifth aspect, a decoder is provided comprising one or more processors; and a non-transitory computer-readable storage medium coupled to the processors and storing programming for execution by the processors, wherein the programming, when executed by the processors, configures the decoder to carry out the method according to the first or third aspect.

In a sixth aspect, an encoder is provided comprising one or more processors; and a non-transitory computer-readable storage medium coupled to the processors and storing programming for execution by the processors, wherein the programming, when executed by the processors, configures the encoder to carry out the method according to the first or third aspect.

In a seventh aspect, anon-transitory computer-readable medium carrying a program code which, when executed by a computer device, causes the computer device to perform the method of the first or third aspect.

The foregoing and other objects are achieved by the subject matter of the independent claims. Further implementation forms are apparent from the dependent claims, the description and the figures.

Details of one or more embodiments are set forth in the accompanying drawings and the description below. Other features, objects, and advantages will be apparent from the description, drawings, and claims.

BRIEF DESCRIPTION OF THE DRAWINGS

Additional features of embodiments are described in more detail with reference to the accompanying drawing figures, in which.

Figure 1A:
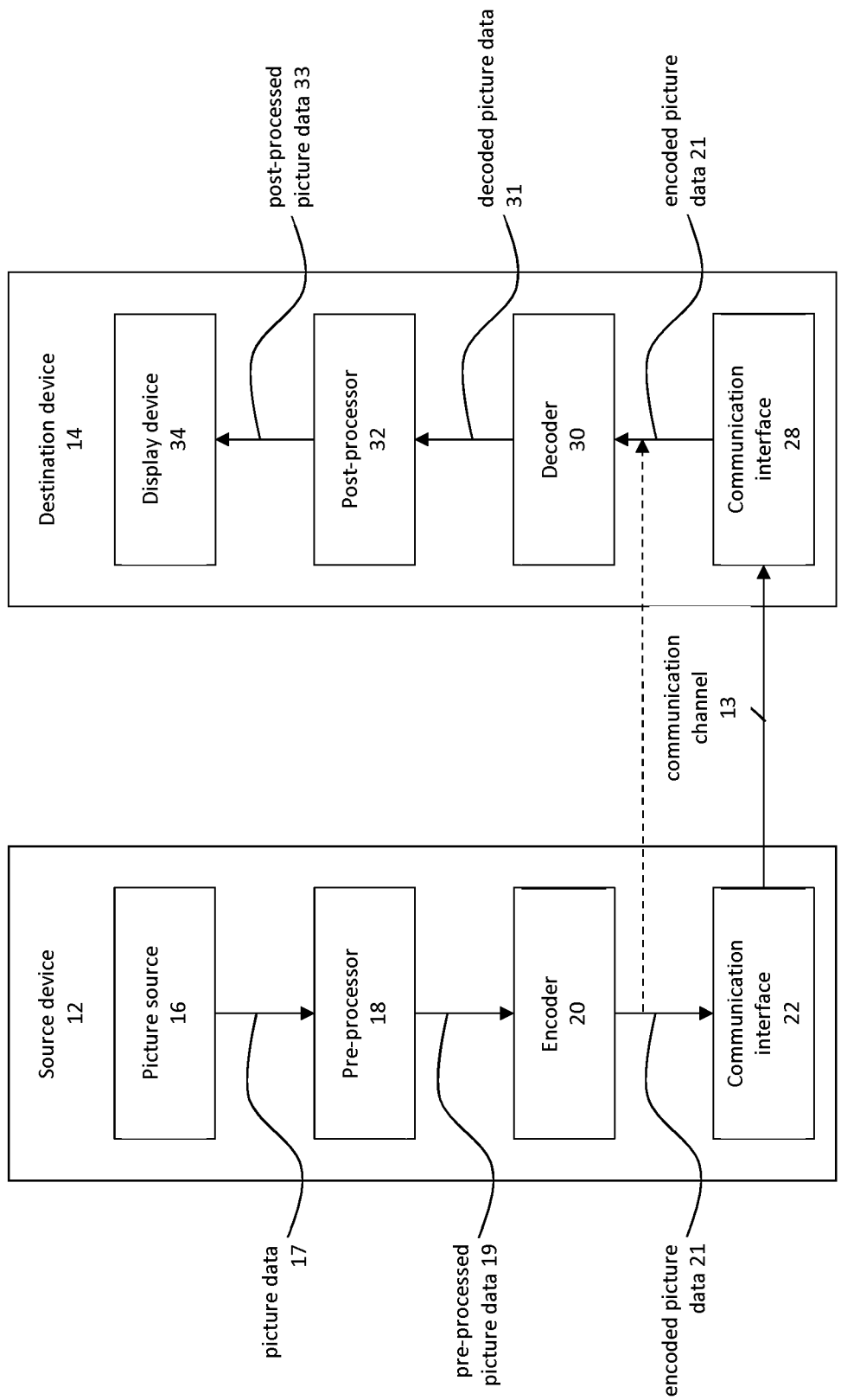
FIG. 1A is a block diagram showing an example of a video coding system configured to implement embodiments of the application.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the application or specific aspects in which embodiments of the present application may be used. It is understood that embodiments of the application may be used in other aspects and comprise structural or logical changes not depicted in the figures. The following detailed description, therefore, is not to be taken in a limiting sense, and the scope of the present application is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts: video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures might be reconstructed, i.e., the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e., the quality of the reconstructed video pictures is lower or worse compared to the quality of the original video pictures.

Several video coding standards belong to the group of "lossy hybrid video codecs" (i.e., combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e., encoded, on a block (video block) level, e.g., by using spatial (intra-picture) prediction and/or temporal (inter-picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter-predictions) and/or re-constructions for processing, i.e., coding, the subsequent blocks.

In the following embodiments of a video coding system, a video encoder 20 and a video decoder 30 are described based on FIGS. 1 to 3.

FIG. 1A is a schematic block diagram illustrating an example coding system 10, e.g., a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 to a destination device 14 for decoding the encoded picture data 13.

The source device 12 comprises an encoder 20, and may additionally comprise a picture source 16, a pre-processor (or pre-processing unit) 18 such as a picture pre-processor, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In contrast to the pre-processor 18 and the processing performed by the pre-processing unit 18, the picture or picture data 17 may also be referred to as raw picture or raw picture data. Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from RGB to YCbCr), color correction, or de-noising. It might be understood that the pre-processing unit 18 may be optional component. The video encoder 20 is configured to receive the pre-processed picture data 19 and to provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, such as the destination device 14 or any other device, for storage or reconstruction. The destination device 14 comprises a decoder such as video decoder 30, and may additionally comprise a communication interface or communication unit 28, a post-processor 32 (or post-processing unit 32) and a display device 34. The communication interface 28 of the destination device 14 is configured to receive the encoded picture data 21 (or any further processed version thereof) directly from the source device 12 or from any other source, such as a storage device or an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, such as a direct wired or wireless connection, or via any kind of network, such as a wired or wireless network or any combination thereof, or any kind of private and public network, or any kind of combination thereof. The communication interface 22 may be, e.g., configured to package the encoded picture data 21 into an appropriate format such as packets, and/or process the encoded picture data using any kind of transmission encoding or processing for transmission over a communication link or communication network. The communication interface 28, forming the counterpart of the communication interface 22, may be configured to receive the transmitted data and process the transmission data using any kind of corresponding transmission decoding or processing and/or de-packaging to obtain the encoded picture data 21.

Communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured to send and to receive messages to, for example, set up a connection and to acknowledge and exchange any other information related to the communication link and/or data transmission such as an encoded picture data transmission. The decoder 30 is configured to receive the encoded picture data 21 and to provide decoded picture data 31 or a decoded picture 31 (further details will be described below with reference to FIG. 3 and FIG. 5).

The post-processor 32 of destination device 14 is configured to post-process the decoded picture data 31 (also called reconstructed picture data) to obtain post-processed picture data such as a post-processed picture 33. The post-processing performed by the post-processing unit 32 may comprise color format conversion (e.g. from YCbCr to RGB), color correction, trimming, or re-sampling, or any other processing for preparing the decoded picture data 31 for display, such as by display device 34. The display device 34 of the destination device 14 is configured to receive the post-processed picture data 33 for displaying the picture to a user or viewer. The display device 34 may be or comprise any kind of display for representing the reconstructed picture, and can be in the form of an integrated or external display or monitor. The displays may comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise functionalities of both the source device 12 and the destination device 14. In such embodiments the source device 12 or corresponding functionality and the destination device 14 may be implemented using the same hardware and/or software or by separate hardware and/or software or any combination thereof. As will be apparent for the skilled person based on the description, the existence and (specific) split of functionalities of the different units or functionalities within the source device 12 and/or destination device 14 as shown in FIG. 1A may vary depending on the actual device and application.

Figure 1B:
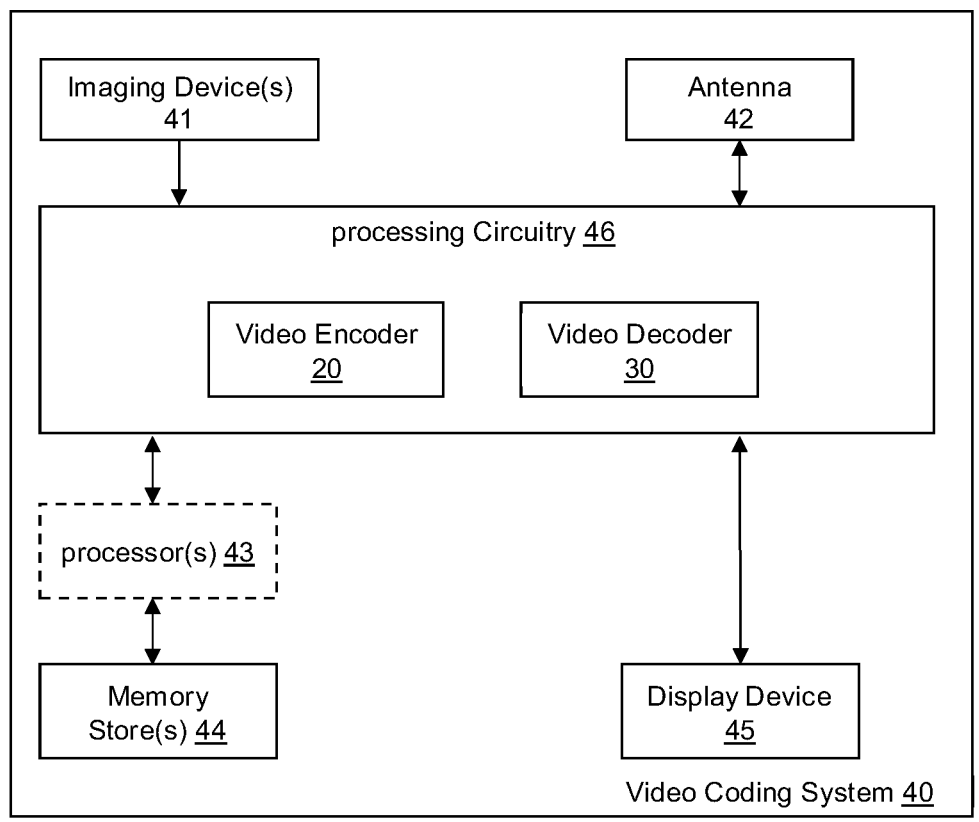
FIG. 1B is a block diagram showing another example of a video coding system configured to implement embodiments of the application.
Figure 5:
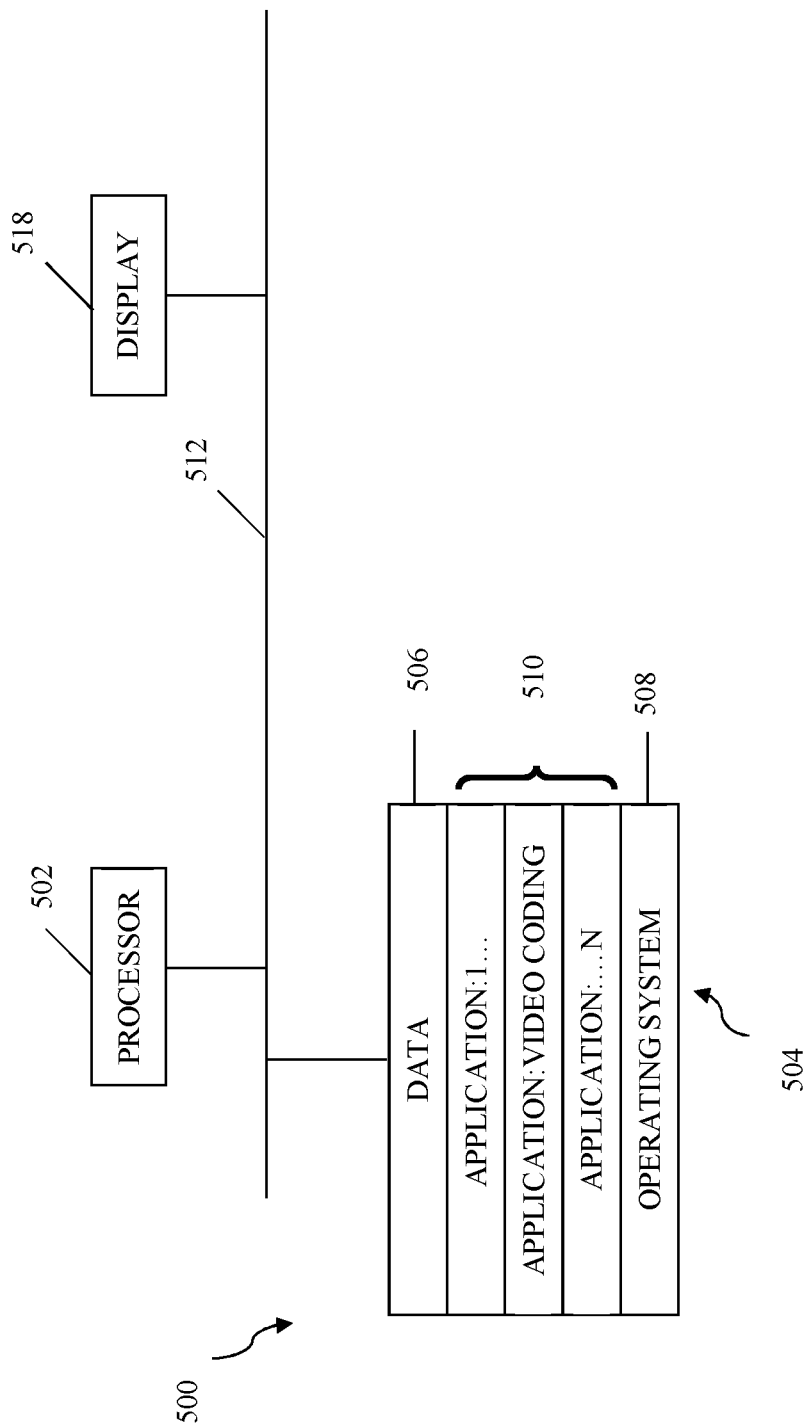
FIG. 5 is a block diagram illustrating another example of an encoding apparatus or a decoding apparatus.

One or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 or video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices such as notebook or laptop computers, mobile phones, smart phones, tablets or tablet computers, cameras, desktop computers, set-top boxes, televisions, display devices, digital media players, video gaming consoles, video streaming devices(such as content services servers or content delivery servers), broadcast receiver device, broadcast transmitter device, or the like and may use any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory and streamed over a network or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory. For convenience of description, embodiments of the application are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the application are not limited to HEVC or VVC.

Encoder and Encoding Method

Figure 2:
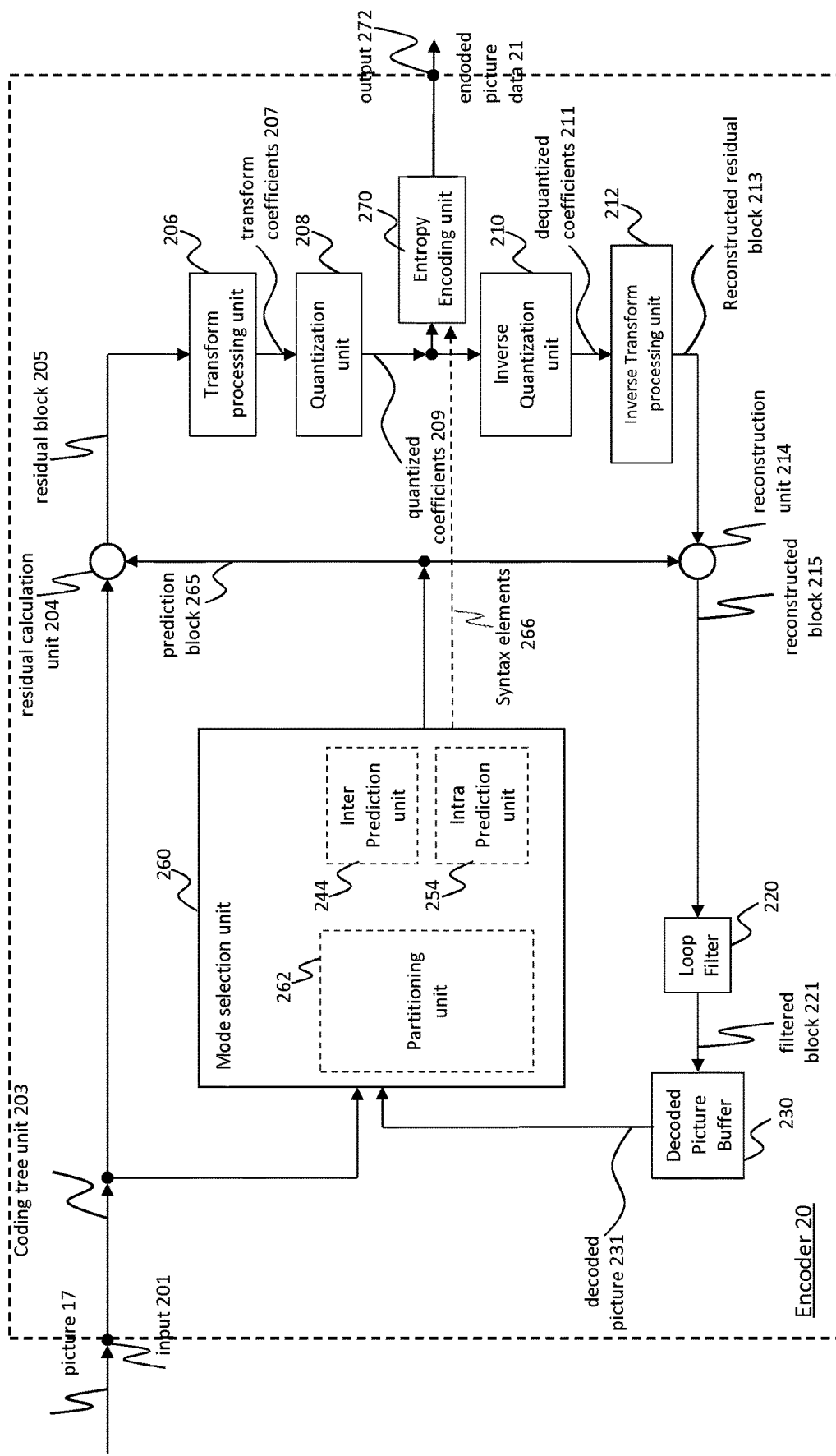
FIG. 2 is a block diagram showing an example of a video encoder configured to implement embodiments of the application.

FIG. 2 shows a schematic block diagram of an example video encoder 20 that is configured to implement the techniques of an embodiment of the present disclosure. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter-prediction unit 244, an intra-prediction unit 254 and a partitioning unit 262. Inter-prediction unit 244 may include a motion estimation unit and a motion compensation unit (not shown). A video encoder 20 as shown in FIG. 2 may also be referred to as hybrid video encoder or a video encoder according to a hybrid video codec. The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter-prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter-prediction unit 244 and the intra-prediction unit 254 are also referred to forming the "built-in decoder" of video encoder 20.

Pictures & Picture Partitioning (Pictures & Blocks)

The encoder 20 may be configured to receive via input 201, a picture 17 (or picture data) such as a picture of a sequence of pictures forming a video or video sequence. The received picture or picture data may also be in the form of a pre-processed picture 19 (or pre-processed picture data).

For sake of simplicity the following description refers to the picture 17. The picture 17 may also be referred to as "current" picture or picture to be coded (in particular in video coding to distinguish the current picture from other pictures such as those previously encoded and/or decoded pictures of the same video sequence, i.e., the video sequence which also comprises the current picture).

A (digital) picture is or might be regarded as a two-dimensional array or matrix of samples with intensity values. A sample in the array may also be referred to as pixel (short form of picture element) or a "pel". The number of samples in horizontal and vertical direction (or axis) of the array or picture define the size and/or resolution of the picture. For representation of color, typically three color components are employed, i.e., the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or "luma") component Y represents the brightness or grey level intensity (e.g., like in a grey-scale picture), while the two chrominance (or "chroma") components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or might be regarded as a two-dimensional array or matrix of samples with intensity values (sample values), although of smaller dimension than the picture 17. In other words, the block 203 may comprise one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, be in the form of an M×N (M-column by N-row) array of samples, or an M×N array of transform coefficients.

Embodiments of the video encoder 20 as shown in FIG. 2 may be configured to encode the picture 17 block by block such that the encoding and prediction is performed per block 203.

Embodiments of the video encoder 20 as shown in FIG. 2 may be further configured to partition and/or encode the picture by using slices (also referred to as video slices), for which a picture may be partitioned into or encoded using one or more slices (typically non-overlapping), and each slice may comprise one or more blocks (such as CTUs) or one or more groups of blocks (such as tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise one or more blocks (CTUs) or one or more tiles, for which each tile may be of rectangular shape and may comprise one or more complete or fractional blocks (CTUs).

Residual Calculation

The residual calculation unit 204 may be configured to calculate a residual block 205 (also referred to as "residual") based on the picture block 203 and a prediction block 265 such as by subtracting sample values of the prediction block 265 from sample values of the picture block 203, sample by sample (pixel by pixel) to obtain the residual block 205 in the sample domain. Further details about the prediction block 265 are provided below.

Transform

The transform processing unit 206 may be configured to apply a transform, such as a discrete cosine transform (DCT) or discrete sine transform (DST), on the sample values of the residual block 205 to obtain transform coefficients 207 in a transform domain. The transform coefficients 207 may also be referred to as "transform residual coefficients" and represent the residual block 205 in the transform domain. The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, and the like. Specific scaling factors may, for example, be specified for the inverse transform, such as by inverse transform processing unit 212 (and the corresponding inverse transform (such as by inverse transform processing unit 312 at video decoder 30) and corresponding scaling factors for the forward transform, e.g., by transform processing unit 206, at an encoder 20. Embodiments of the video encoder 20 (respectively transform processing unit 206) may be configured to output transform parameters such as type of transform or transforms, such as whether the transforms are directly or encoded or compressed via the entropy encoding unit 270, so that the video decoder 30 may receive and use the transform parameters for decoding.

Quantization

The quantization unit 208 may be configured to quantize the transform coefficients 207 to obtain quantized coefficients 209 by, for example, applying scalar quantization or vector quantization. The quantized coefficients 209 may also be referred to as "quantized transform coefficients" 209 or "quantized residual coefficients" 209. The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding inverse dequantization (such as by inverse quantization unit 210) and may include multiplication by the quantization step size. Embodiments according to some standards (for example, HEVC) may be configured to use a quantization parameter to determine the quantization step size. Generally, the quantization step size may be calculated based on a quantization parameter using a fixed-point approximation of an equation including division. Additional scaling factors may be introduced for quantization and dequantization to restore the norm of the residual block, which might get modified because of the scaling used in the fixed-point approximation of the equation for quantization step size and quantization parameter. In one example implementation, the scaling of the inverse transform and dequantization might be combined. Alternatively, customized quantization tables may be used and signaled from an encoder to a decoder, such as in a bitstream. The quantization is a lossy operation, for which the loss increases with increasing quantization step sizes. Embodiments of the video encoder 20 (respectively quantization unit 208) may be configured to output quantization parameters ("QP") directly or encoded via the entropy encoding unit 270 so that, for example, the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211 such as by applying the inverse of the quantization scheme applied by the quantization unit 208 based on or using the same quantization step size as the quantization unit 208. The dequantized coefficients 211 may also be referred to as "dequantized residual coefficients" 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206 (that is, apply an inverse discrete cosine transform (DCT) or inverse discrete sine transform (DST) or other inverse transforms) to obtain a reconstructed residual block 213 (or corresponding dequantized coefficients 213) in the sample domain. The reconstructed residual block 213 may also be referred to as a "transform block".

Reconstruction

The reconstruction unit 214 (e.g., adder or summer 214) is configured to add the transform block 213 (i.e., reconstructed residual block) to the prediction block 265 to obtain a reconstructed block 215 in the sample domain, such as by adding—sample by sample—the sample values of the reconstructed residual block 213 and the sample values of the prediction block 265.

Filtering

The loop filter unit 220 is configured to filter the reconstructed block 215 to obtain a filtered block 221, or in general, to filter reconstructed samples to obtain filtered sample values. The loop filter unit is configured to smooth pixel transitions, or otherwise improve the video quality. The loop filter unit 220 may comprise one or more loop filters such as a de-blocking filter, a sample-adaptive offset (SAO) filter or one or more other filters (such as an adaptive loop filter (ALF), a noise suppression filter (NSF)), or any combination of de-blocking filter, SAO filter, ALF filter, or NSF filter. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop re-shaper) is added. This process is performed before deblocking. In another example, the deblocking filter process may be also applied to internal sub-block edges, such as affine sub-blocks edges, advanced temporal motion vector prediction (ATMVP) sub-blocks edges, sub-block transform (SBT) edges and intra sub-partition (ISP) edges. Although the loop filter unit 220 is shown in FIG. 2 as being an in-loop filter, in other configurations, the loop filter unit 220 may be implemented as a post-loop filter. The filtered block 221 may also be referred to as a filtered reconstructed block 221. Embodiments of the video encoder 20 (respectively loop filter unit 220) may be configured to output loop filter parameters (such as SAO filter parameters or ALF filter parameters or LMCS parameters) directly or encoded via the entropy encoding unit 270, so that a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magneto-resistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, such as previously reconstructed and filtered blocks 221, of the same current picture or of different (e.g., previously reconstructed) pictures, and may provide complete, previously reconstructed (i.e., decoded), pictures and corresponding reference blocks and samples and/or a partially reconstructed current picture (and corresponding reference blocks and samples), for example for inter-prediction. The decoded picture buffer (DPB) 230 may also be configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data such as an original block 203 (current block 203 of the current picture 17), and reconstructed picture data such as filtered and/or unfiltered reconstructed samples or blocks of the same (current) picture and/or from one or a plurality of previously decoded pictures from decoded picture buffer 230 or other buffers such as line buffers (not shown). The reconstructed picture data is used as reference picture data for prediction, inter-prediction or intra-prediction, to obtain a prediction block 265 or predictor 265. Mode selection unit 260 may be configured to determine or select a partitioning for a current block prediction mode (including no partitioning) and a prediction mode (such as an intra or inter-prediction mode) and generate a corresponding prediction block 265 that can be used for the calculation of the residual block 205 and for the reconstruction of the reconstructed block 215.

Embodiments of the mode selection unit 260 may be configured to select the partitioning and the prediction mode from the modes supported by or available for mode selection unit 260) that provides the best match or the minimum residual ("minimum residual" means better compression for transmission or storage), or a minimum signaling overhead ("minimum signaling overhead" means better compression for transmission or storage), or which considers or balances both. The mode selection unit 260 may be configured to determine the partitioning and prediction mode based on rate distortion optimization (RDO), i.e., select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time. In other words, the partitioning unit 262 may be configured to partition a picture from a video sequence into a sequence of coding tree units (CTUs), and the CTU 203 may be further partitioned into smaller block partitions or sub-blocks (which form again blocks) iteratively using quad-tree-partitioning (QT), binary partitioning (BT), triple-tree-partitioning (TT), or any combination thereof, and to perform the prediction for each of the block partitions or sub-blocks, wherein the mode selection comprises the selection of the tree-structure of the partitioned block 203 and the prediction modes are applied to each of the block partitions or sub-blocks. Partitioning by partitioning unit 260 and prediction processing inter-prediction unit 244 and intra-prediction unit 254 performed by an example video encoder 20 is explained in greater detail below.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions or smaller blocks of square or rectangular shape. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it might be specified to be value rather than 128×128 in the future, for example, 256×256. The CTUs of a picture may be clustered/grouped as slices/tile groups, tiles or bricks. A tile covers a rectangular region of a picture, and a tile might be divided into one or more bricks. A brick consists of a number of CTU rows within a tile. A tile that is not partitioned into multiple bricks might be referred to as a brick. However, a brick is a true subset of a tile and is not referred to as a tile. There are two modes of tile groups supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block (for example, a block at root tree-level 0 (hierarchy-level 0, depth 0), may be recursively partitioned into two or more blocks of a next lower tree-level (e.g., nodes at tree-level 1 (hierarchy-level 1, depth 1)), wherein these blocks may be again partitioned into two or more blocks of a next lower level (e.g., tree-level 2 (hierarchy-level 2, depth 2)), etc. until the partitioning is terminated, a when because a termination criterion is fulfilled, as when a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT). For example, a coding tree unit (CTU) may be or comprise a coding tree block (CTB) of luma samples, two corresponding CTBs of chroma samples of a picture that has three sample arrays, or a CTB of samples of a monochrome picture or a picture that is coded using three separate color planes and syntax structures used to code the samples. Correspondingly, a CTB may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. A coding block (CB) may be an M×N block of samples for some values of M and N such that the division of a CTB into coding blocks is a partitioning.

In HEVC embodiments, a coding tree unit (CTU) may be split into a number of coding units (CUs) by using a quad-tree structure denoted as a coding tree. The decision whether to code a picture area using inter-picture (temporal) or intra-picture (spatial) prediction is made at the leaf CU level. Each leaf CU might be further split into one, two or four Prediction Unit (PU) according to the PU splitting type. Inside one PU, the same prediction process is applied, and the relevant information is transmitted to the decoder on a PU basis. After obtaining the residual block by applying the prediction process based on the PU splitting type, a leaf CU might be partitioned into transform units (TUs) according to another quadtree structure similar to the coding tree for the CU. In embodiments according to the Versatile Video Coding (VVC) standard, a combined Quad-tree nested multi-type tree using binary and ternary splits segmentation structure to partition a coding tree unit. In the coding tree structure within a coding tree unit, a CU can have either a square or rectangular shape. For example, the coding tree unit (CTU) is first partitioned by a quaternary tree. The quaternary tree leaf nodes might be further partitioned by a multi-type tree structure. There are four splitting types in multi-type tree structure: vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quad-tree with nested multi-type tree coding block structure. The exception occurs when maximum supported transform length is smaller than the width or height of the color component of the CU.

Figure 6:
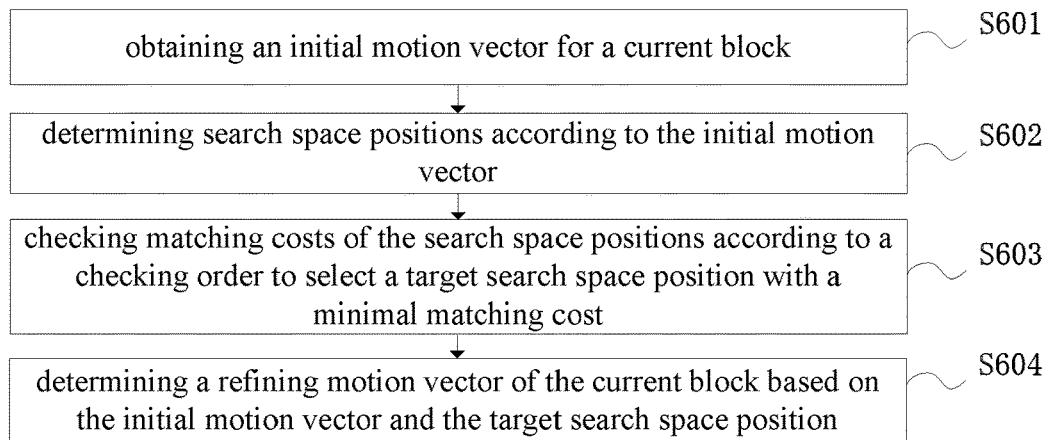
FIG. 6 is a block diagram illustrating another example of a prediction method.

VVC develops a unique signaling mechanism of the partition splitting information in quad-tree with nested multi-type tree coding tree structure. In the signaling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signaled to indicate whether the node is further partitioned; when a node is further partitioned, a second flag (mtt_split_cu_vertical_flag) is signaled to indicate the splitting direction, and then a third flag (mtt_split_cu_binary_flag) is signaled to indicate whether the split is a binary split or a ternary split. Based on the values of mtt_split_cu_vertical_flag and mtt_split_cu_binary_flag, the multi-type tree slitting mode (MttSplitMode) of a CU might be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size might be set to maximum transform block (TB) size. However, in VVC, ternary tree (TT) and binary tree (BT) partition may lead to the increasing of VPDUs sizes. In addition, it should be noted that, when a portion of a tree node block exceeds the bottom or right picture boundary, the tree node block is forced to be split until all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein. As described above, the video encoder 20 is configured to determine or select the best or an optimum prediction mode from a set of pre-determined prediction modes. The set of prediction modes may comprise intra-prediction modes and/or inter-prediction modes.

Intra-Prediction

The set of intra-prediction modes may comprise 35 different intra-prediction modes, such as non-directional modes, like DC (or mean) mode and planar mode, or directional modes, such as defined in HEVC, or may comprise 67 different intra-prediction modes (e.g., non-directional modes like DC (or mean) mode and planar mode), or directional modes such as those defined for VVC. As an example, several conventional angular intra prediction modes are adaptively replaced with wide-angle intra prediction modes for the non-square blocks such as those defined for VVC. As another example, to avoid division operations for DC prediction, only the longer side is used to compute the average for non-square blocks. Results of intra-rediction of planar mode may be further modified by a position dependent intra-prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra-prediction unit 254 (or in general, the mode selection unit 260) is further configured to output intra-prediction parameters (or in general, information indicative of the selected intra prediction mode for the block) to the entropy encoding unit 270 in form of syntax elements 266 for inclusion into the encoded picture data 21 so that the video decoder 30 may receive and use the prediction parameters for decoding.

Inter-Prediction

The set of (or possible) inter-prediction modes depends on the available reference pictures (i.e., previous at least partially decoded pictures such as pictures stored in DBP 230) and other inter-prediction parameters such as those that determine whether the whole reference picture or only a part, such as a search window area around the area of the current block, of the reference picture is used for searching for a best matching reference block, and/or whether pixel interpolation is applied, half/semi-pel, quarter-pel and/or 1/16 pel interpolation, or not.

Additional to the above prediction modes, skip mode, direct mode and/or other inter-prediction mode may be applied. For example, for extended merge prediction, the merge candidate list of such mode is constructed by including the following five types of candidates in order: Spatial motion vector prediction (MVP) from spatial neighbor CUs, Temporal MVP from collocated CUs, History-based MVP from a first in-first out (FIFO) table, Pairwise average MVP and Zero MVs. A bilateral-matching based decoder side motion vector refinement (DMVR) may be applied to increase the accuracy of the MVs of the merge mode. Merge mode with motion vector difference, MVD (MMVD), which comes from merge mode with motion vector differences. A MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU might be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblockbased temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier.

The inter-prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks such as reconstructed blocks of one or a plurality of other/different previously decoded pictures 231, for motion estimation. The picture block 203 may be in the form of a video sequence may comprise the current picture and the previously decoded pictures 231, or in other words, the current picture and the previously decoded pictures 231 may be part of or form a sequence of pictures forming a video sequence. The encoder 20 may be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter-prediction parameters to the motion estimation unit. This offset is also called motion vector (MV).

The motion compensation unit is configured to obtain or to receive, an inter-prediction parameter and to perform inter-prediction based on or using the inter-prediction parameter to obtain an inter-prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists. The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter-prediction parameters, intra prediction parameters, loop filter parameters and/or other syntax elements) to obtain encoded picture data 21 which can be output via the output 272 such as in the form of an encoded bitstream 21 so that the video decoder 30 may receive and use the parameters for decoding. The encoded bitstream 21 may be transmitted to video decoder 30, or stored in a memory for later transmission or retrieval by video decoder 30. Other structural variations of the video encoder 20 might be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

Figure 3:
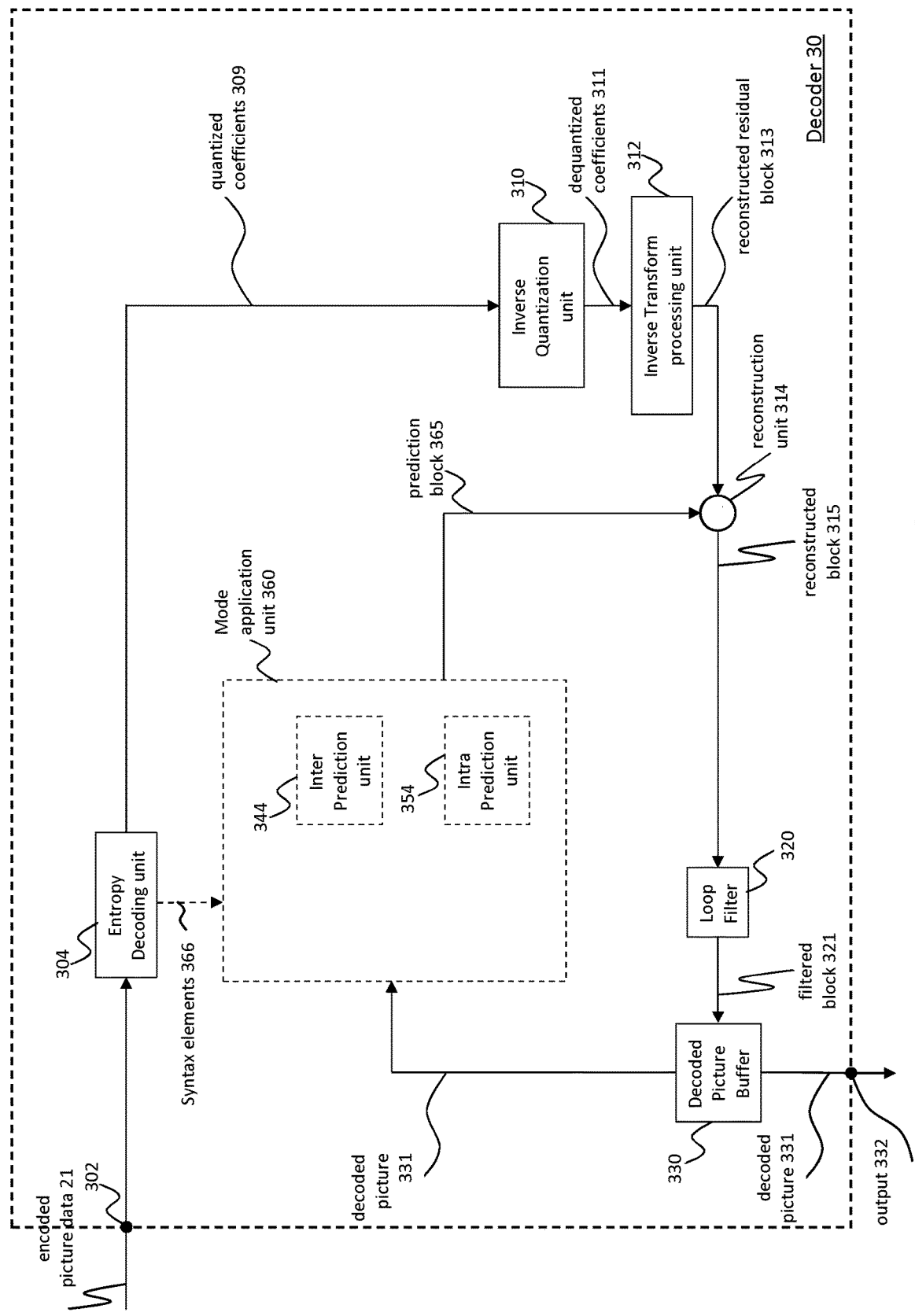
FIG. 3 is a block diagram showing an example structure of a video decoder configured to implement embodiments of the application.

FIG. 3 shows an example of a video decoder 30 that is configured to implement the techniques of this present application. The video decoder 30 is configured to receive encoded picture data 21 (e.g., encoded bitstream) encoded by encoder 20 to obtain a decoded picture 331. The encoded picture data or bitstream comprises information for decoding the encoded picture data, such as data that represents picture blocks of an encoded video slice (and/or tile groups or tiles) and associated syntax elements. In the example of FIG. 3, the decoder 30 comprises an entropy decoding unit 304, an inverse quantization unit 310, an inverse transform processing unit 312, a reconstruction unit 314 (such as a summer), a loop filter 320, a decoded picture buffer (DBP) 330, a mode application unit 360, an inter-prediction unit 344 and an intra prediction unit 354. Inter-prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the decoded picture buffer (DPB) 230, the inter-prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain quantized coefficients 309 and/or decoded coding parameters (not shown in FIG. 3), any or all of inter-prediction parameters (such as reference picture index and motion vector), intra prediction parameter (such as intra-prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter-prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (which can be obtained by parsing and/or decoding by entropy decoding unit 304) and to apply, based on the quantization parameters, an inverse quantization on the decoded quantized coefficients 309 to obtain dequantized coefficients 311 (also referred to as transform coefficients. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients, and to apply a transform to the dequantized coefficients 311 in order to obtain reconstructed residual blocks 213 in the sample domain. The reconstructed residual blocks 213 may also be referred to as transform blocks. The transform may be an inverse transform, such as an inverse DCT, an inverse DST, an inverse integer transform, or a conceptually similar inverse transform process. The inverse transform processing unit 312 may be further configured to receive transform parameters or corresponding information from the encoded picture data 21 (such as by parsing and/or decoding by entropy decoding unit 304) to determine the transform to be applied to the dequantized coefficients 311.

Reconstruction

The reconstruction unit 314 (adder or summer) may be configured to add the reconstructed residual block 313 to the prediction block 365 to obtain a reconstructed block 315 in the sample domain, such as by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321 to smooth pixel transitions, or otherwise improve the video quality. The loop filter unit 320 may comprise one or more loop filters such as a de-blocking filter, a sample-adaptive offset (SAO) filter or one or more other filters, such as an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before de-blocking. In another example, the de-blocking filter process may be also applied to internal sub-block edges, such as affine sub-blocks edges, ATMVP sub-blocks edges, sub-block transform (SBT) edges and intra sub-partition (ISP) edges. Although the loop filter unit 320 is shown in FIG. 3 as being an in-loop filter, in other configurations, the loop filter unit 320 may be implemented as a post-loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display. The decoder 30 is configured to output the decoded picture 311 via output 312 for presentation or viewing to a user.

Prediction

The inter-prediction unit 344 may be identical to the inter-prediction unit 244 (in particular, to the motion compensation unit) and the intra-prediction unit 354 may be identical to the inter-prediction unit 254 in function, and performs split or partitioning decisions and prediction based on the partitioning and/or prediction parameters or respective information received from the encoded picture data 21 (such as by parsing and/or decoding by entropy decoding unit 304). Mode application unit 360 may be configured to perform the prediction (intra- or inter-prediction) per block based on reconstructed pictures, blocks or respective samples (filtered or unfiltered) to obtain the prediction block 365. When the video slice is coded as an intra-coded (I) slice, intra-prediction unit 354 of mode application unit 360 is configured to generate prediction block 365 for a picture block of the current video slice based on a signaled intra-prediction mode and data from previously decoded blocks of the current picture. When the video picture is coded as an inter-coded (i.e., B, or P) slice, inter-prediction unit 344 (e.g., motion compensation unit) of mode application unit 360 is configured to produce prediction blocks 365 for a video block of the current video slice based on the motion vectors and other syntax elements received from entropy decoding unit 304. For inter-prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups such as video tile groups and/or tiles such as video tiles, in addition or alternatively to slices such as video slices. Video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (intra or inter-prediction) used to code the video blocks of the video slice, an inter-prediction slice type (B slice, P slice, or GPB slice), construction information for one or more of the reference picture lists for the slice, motion vectors for each inter encoded video block of the slice, inter-prediction status for each inter-coded video block of the slice, and other information to decode the video blocks in the current video slice. The same or similar may be applied for or by embodiments using tile groups such as video tile groups and/or tiles such as video tiles in addition or alternatively to slices such as video slices). Video may be coded using I, P or B tile groups and/or tiles.

Embodiments of the video decoder 30 as shown in FIG. 3 may be configured to partition and/or decode the picture by using slices (also referred to as video slices), for which a picture may be partitioned into, or decoded using, one or more slices (typically non-overlapping). Each slice may comprise one or more blocks (e.g., CTUs) or one or more groups of blocks (e.g., tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), for which a picture may be partitioned into or decoded using one or more slices/tile groups (typically non-overlapping), and each slice/tile group may comprise one or more blocks (e.g., CTUs) or one or more tiles, wherein each tile may be of rectangular shape and may comprise one or more blocks or CTUs to form complete or fractional blocks.

Other variations of the video decoder 30 might be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit. It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(bitDepth-1) \sim 2^{\wedge}(bitDepth-1)-1$, where "^" means exponentiation. For example, if bitDepth is set equal to 16, the range is $-32768 \sim 32767$; if bitDepth is set equal to 18, the range is $-131072$-$131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
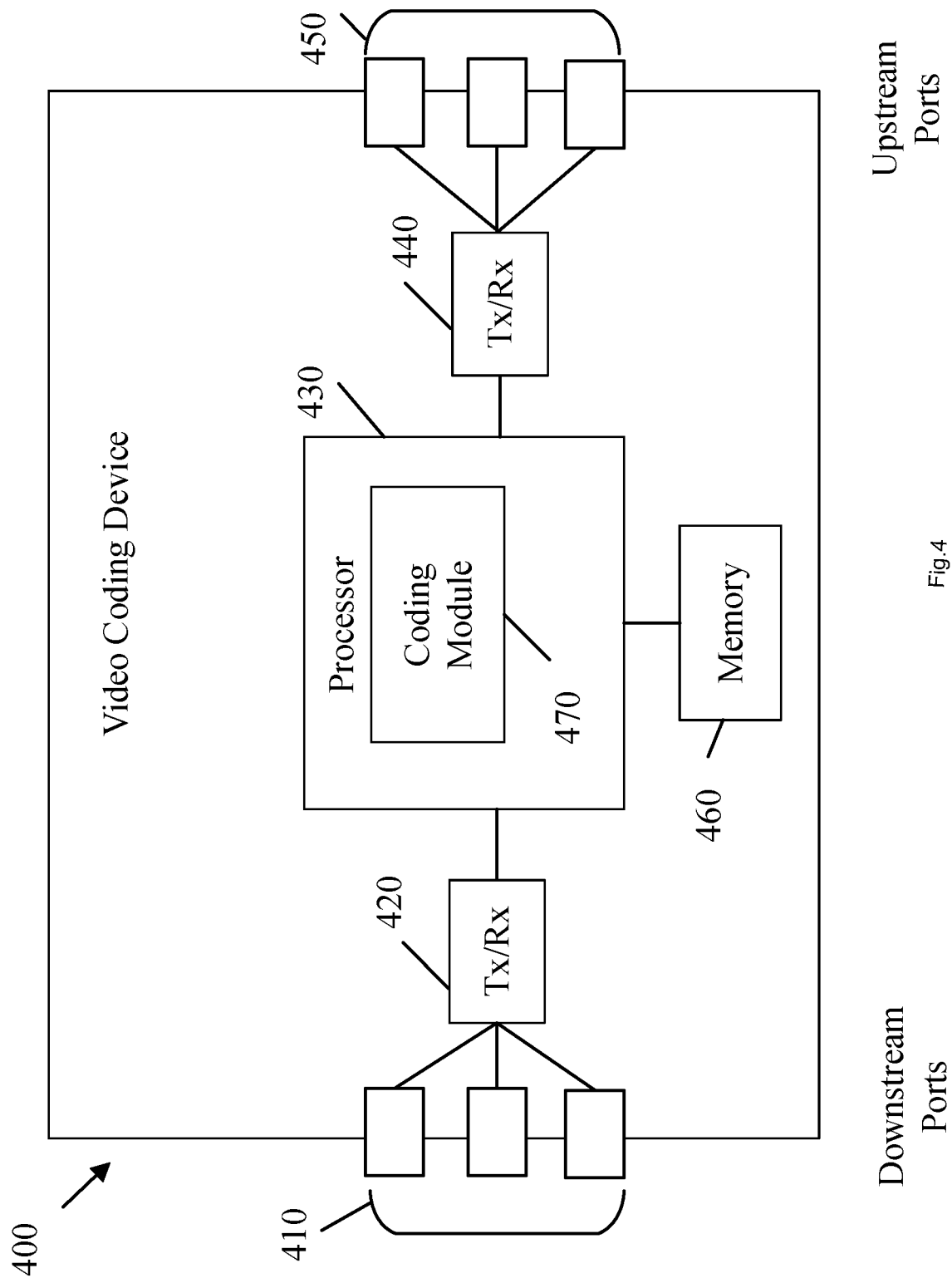
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

FIG. 5 is a simplified block diagram of an apparatus 500 that may be used as either or both of the source device 12 and the destination device 14 from FIG. 1 according to an exemplary embodiment. A processor 502 in the apparatus 500 might be a central processing unit. Alternatively, the processor 502 might be any other type of device, or multiple devices, capable of manipulating or processing information now-existing or hereafter developed. Although the disclosed implementations might be practiced with a single processor as shown, e.g., the processor 502, advantages in speed and efficiency might be achieved using more than one processor. A memory 504 in the apparatus 500 might be a read only memory (ROM) device or a random access memory (RAM) device in an implementation. Any other suitable type of storage device might be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include one or more output devices, such as a display 518. The display 518 may be, in one example, a touch sensitive display that combines a display with a touch sensitive element that is operable to sense touch inputs. The display 518 might be coupled to the processor 502 via the bus 512.

Although depicted here as a single bus, the bus 512 of the apparatus 500 might be composed of multiple buses. Further, the secondary storage 514 might be directly coupled to the other components of the apparatus 500 or might be accessed via a network and can comprise a single integrated unit such as a memory card or multiple units such as multiple memory cards. The apparatus 500 can thus be implemented in a wide variety of configurations. Current hybrid video codecs employ predictive coding. A picture of a video sequence is subdivided into blocks of pixels and these blocks are then coded. Instead of coding a block pixel by pixel, the entire block is predicted using previously encoded pixels in the spatial or temporal proximity of the block. The encoder further processes only the differences between the block and its prediction. The further processing typically includes a transformation of the block pixels into coefficients in a transformation domain. The coefficients may then be further compressed (e.g., by means of quantization) and further compacted (e.g., by entropy coding) to form a bitstream. The bitstream can further include any signaling information which enables the decoder to decode the encoded video. For instance, the signaling may include settings concerning the encoder settings such as size of the input picture, frame rate, quantization step indication, prediction applied to the blocks of the pictures, or the like.

The differences between a block and its prediction are known as the residual of the block. More specifically, each pixel of the block has a residual, which is the difference between an intensity level of that pixel and its predicted intensity level. The intensity level of a pixel is referred to as the pixel value or value of the pixel. The residuals of all the pixels of a block are referred to collectively as the residual of the block. In other words, the block has a residual which is a set or matrix comprises the residuals of all the pixels of the block. Temporal prediction exploits temporal correlation between pictures, also referred to as frames, of a video. The temporal prediction is also called inter-prediction, as it is a prediction using the dependencies between (inter) different video frames. Accordingly, a block to be decoded, also referred to as a current block, is predicted from one or more previously decoded pictures referred to as reference pictures. The one or more reference pictures are not necessarily pictures preceding the current picture in which the current block is located in the displaying order of the video sequence. The encoder may encode the pictures in a coding order different from the displaying order. As a prediction of the current block, a co-located block (referred to as a predictor) in a reference picture may be determined. The co-located block may be located in the reference picture on the same position as the current block in the current picture. Such prediction is accurate for motionless picture regions, i.e., picture regions without movement from one picture to another.

In the encoder, in order to obtain a predictor which takes movement into account, i.e., a motion compensated predictor, motion estimation is typically employed. The current block is predicted by a block located in the reference picture at a position indicated by a motion vector. The motion vector points from the position of the co-located block to the position of the current block (or vice versa, depending on the sign convention). In order to enable a decoder to determine the same prediction of the current block as the encoder, the motion vector may be signaled in the bitstream. In order to further reduce the signaling overhead caused by signaling the motion vector for each of the blocks, the motion vector itself may be estimated. The motion vector estimation may be performed based on the motion vectors of blocks which are neighbors of the current block in spatial and/or temporal domain.

The prediction of the current block may be computed using one reference picture or by weighting predictions obtained from two or more reference pictures. The reference picture may be an adjacent picture, i.e., a picture immediately preceding or immediately following the current picture in the display order since adjacent pictures are most likely to be similar to the current picture. The reference picture may also be any picture preceding or following the current picture in the displaying order and preceding the current picture in the bitstream (decoding order). This may provide advantages for instance in case of occlusions and/or non-linear movement in the video content. The reference picture may be signaled in the bitstream.

A special mode of the inter-prediction is a so-called bi-prediction in which two reference pictures are used in generating the prediction of the current block. In particular, two predictions determined in the respective two reference pictures are combined into a prediction signal of the current block. The bi-prediction can result in a more accurate prediction of the current block than the uni-prediction, i.e., prediction only using a single reference picture. The more accurate prediction leads to smaller differences between the pixels of the current block and the prediction to smaller residuals, which may be encoded more efficiently, i.e., less coding bits.

In order to provide more accurate motion estimation, the resolution of the reference picture may be enhanced, for example by interpolating samples between pixels. Fractional pixel interpolation can be performed by weighted averaging of the closest pixels. For example, in case of half-pixel resolution, a bilinear interpolation can be used. Other fractional pixels can be calculated as an average of the closest pixels weighted by, for example, the inverse of the distance between the respective closest pixels to the pixel being predicted.

A motion vector can be estimated, for example, by calculating a similarity between the current block and the corresponding prediction blocks pointed to by candidate motion vectors in the reference picture. In order to reduce the complexity, the number of candidate motion vectors can be reduced by limiting the candidate motion vectors to a certain search space. The search space may be, for instance, defined by a number and/or positions of pixels surrounding the position in the reference picture corresponding to the position of the current block in the current image. Alternatively, the candidate motion vectors may be defined by a list of candidate motion vectors formed of motion vectors of neighboring blocks. Motion vectors are usually at least partially determined at the encoder side and signaled to the decoder within the coded bitstream. The motion vectors may also be derived at the decoder. In such case, the current block is not available at the decoder and cannot be used for calculating the similarity between the current block and any of the blocks to which the candidate motion vectors point in the reference picture. Therefore, instead of the current block, a template can be used which can be constructed out of pixels of previously decoded blocks. For instance, previously decoded pixels adjacent to the current block may be used. Such motion estimation provides an advantage of reducing the signaling: the motion vector is derived in the same way at both the encoder and the decoder and thus, no signaling is needed. On the other hand, the accuracy of such motion estimation may be lower.

In order to provide a tradeoff between the accuracy and signaling overhead, the motion vector estimation may be divided into two steps: motion vector derivation and motion vector refinement. For instance, a motion vector derivation may include selection of a motion vector from the list of candidates. The selected motion vector may be further refined, for instance, by a search within a search space. The search in the search space is based on calculating a cost function for each candidate motion vector, i.e., for each candidate position of the block to which the candidate motion vector points.

Document JVET-D0029: Decoder-Side Motion Vector Refinement Based on Bilateral Template Matching, X. Chen, J. An, J. Zheng (The document can be found at: http://phenix.it-sudparis.eu/jvet/site) shows motion vector refinement in which a first motion vector in integer pixel resolution is found and further refined by a search with a half-pixel resolution in a search space around the first motion vector. Here, the pixel resolution (e.g., integer or half-integer) describes the resolution of the search space, i.e., the displacement of the searched points to the non-refined motion vector that is input to the process. As a result, the search coordinates of the refinement stage do not necessarily coincide with the actual pixel coordinates on the image plane. The motion vector refinement may be performed at the decoder without assistance from the encoder. The decoder loop in the encoder may employ the same refinement to obtain corresponding reference pictures. The refinement can be performed by determining a template, determining a search space, and finding in the search space the position of a reference picture portion best matching the template. The best matching portion position determines the best motion vector which is then used to obtain the predictor of the current block, i.e., the current block being reconstructed.

In an embodiment, as shown in FIG. 6, an inter-prediction method comprising:

S601: obtaining an initial motion vector for a current block. An initial motion vector MVO, which can be seen as a first estimate or approximation of the exact motion vector, is obtained. For instance, MVO may be selected from a list of candidate motion vectors. The list may include motion vectors of at least one block adjacent to the current block. Alternatively, MVO may be obtained by block matching at the encoder side and signaled to the decoder side within the bitstream. Correspondingly, at the decoder side, the initial motion vector MVO might be obtained from the bitstream. For instance, an index to the list of candidates is extracted from the bitstream and the motion vector candidate identified by that index is provided as the initial motion vector MVO.

Alternatively, coordinates of MVO are directly extracted from the bitstream. It is noted that the present application is not limited to any particular way of obtaining the initial motion vector MVO. For example, the MVO may be determined by template matching in the same way at the encoder and the decoder. And alternatively, the motion vector may be predicted as a function of motion vectors of the neighboring block of the current block in the spatial or temporal domain.

The initial motion vector MVO is an initial estimate of a final motion vector MVO" to be used in inter-prediction of a current block. It constitutes the input for a refinement process at the end of which the final motion vector MVO" is output.

S602: determining search space positions according to the initial motion vector.

Assuming search space positions comprise the central search positions and neighboring search space positions, and wherein the central search space position is pointed to by the initial motion vector. In an implementation, the step S602 comprises determining the central search space position according to the initial motion vector, and determining the neighboring search space positions according to one or more preset offsets and the central search space position.

In an implementation, a search space consists of the search space positions, and a pattern of the search space is a 5×5 search space position square. As an example, the search space is constructed according to the initial motion vector MVO and one or more candidate motion vectors relate to the initial motion vector. Then the motion vector MVO" (corresponding to coordinates of a search space position) is selected according to the matching cost from the initial motion vector MVO and the one or more candidate motion vectors.

(S603) It is noted that for some candidate motion vectors of the search space might be for all candidate motion vectors of the respective partial search spaces determined in each of the stages. In different embodiments of the present application, the costs may be calculated as a part of and during the search space construction.

In an implementation, the candidate motion vectors for the current block point from the top left pixel of the current block in the current picture to the respective top left pixels of candidate prediction blocks in the reference picture. The top left pixels of the candidate prediction blocks thus represent the search space in the reference picture. The top left pixel of a block is taken as the position of the block. It is noted that any other pixel of a block can be taken as the position of the block, wherein it is understood that the same position convention applies to all blocks. For example, a motion vector may be defined equivalently as running from a center pixel of the current block to the center pixel of a respective candidate block.

It is noted that every candidate motion vector, including the initial motion vector, points to a pixel in the reference picture, which is a search space position. And the coordinate position relationship between pixels pointed by the initial motion vector and by other candidate motion vectors might be represented by one or more motion vector offsets between the initial motion vector and the other candidate motion vectors. The one or more motion vector offsets might be predetermined such that the location relationship between the central search positions and neighboring search space positions might be predetermined.

S603: checking matching costs of the search space positions according to a checking order to select a target search space position with a minimal matching cost.

In an implementation, checking a matching cost of each of the search space positions in turn according to the checking order; and selecting a search space position with the minimal matching cost among the search space positions as the target search space position.

The matching cost may be measured by a cost function which may, for example, be a sum of absolute differences between the template and the reference picture area that corresponds to the template in the location pointed to by the motion vector candidate. After calculating the sum of absolute differences (SAD) for all candidate motion vectors, the candidate with the smallest SAD is selected. It is noted that SAD is only an example. The cost function can be SAD (sum of absolute differences), MRSAD (Mean removed sum of absolute differences), SSE (Sum of squared errors), or any other cost function for representing a similarity. The best motion vector is selected based on the comparisons among the matching costs of the search space positions.

In an implementation, a matching cost of one of the search space positions is compared with a temp minimal matching cost. The matching cost of the one of the search space positions is set as the temp minimal matching cost when the matching cost of the one of the search space positions is smaller than the temp minimal matching cost. The temp minimal matching cost is set as the minimal matching cost after the last one of the search space positions is checked.

Figure 7:
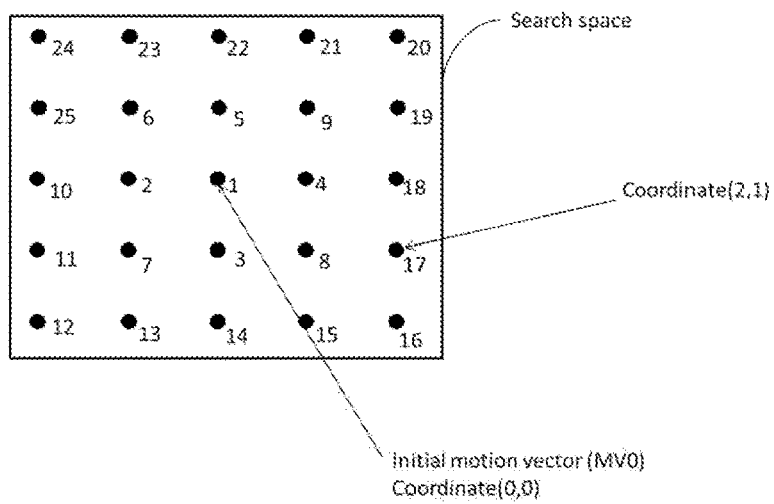
FIG. 7 is an illustration of a checking order.

In an embodiment, the search space might be a square pattern, as shown in FIG. 7. As an example, the pixel pointed to by the initial motion vector is considered as (0, 0) of a coordinate system. And in the coordinate system, horizontal right is considered as a horizontal positive direction and vertical down is considered as a vertical positive direction. The search space might comprise 25 search space positions. And pixels with the coordinates (−2, −2), (2, 2), (−2, 2) and (2, −2) are corners of the square pattern. The 25 search space positions are divided into one or more groups to define the checking order. And it is noted that according to the different embodiments, the step of dividing the search space positions into one or more groups might not be necessary, which is only for clearly describing the design of a kind of checking order is determined. In a first embodiment, the 25 search space positions is divided into two groups:

Group I: (0, 0);
Group II: all other search space positions.

Figure 8:
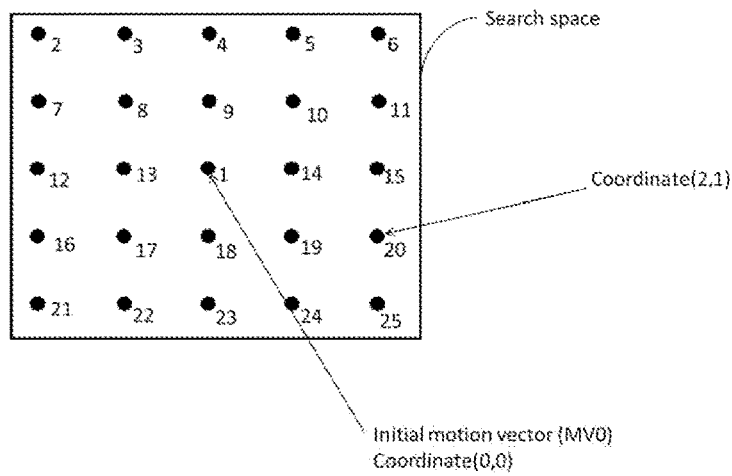
FIG. 8 is another illustration of a checking order.
Figure 9:
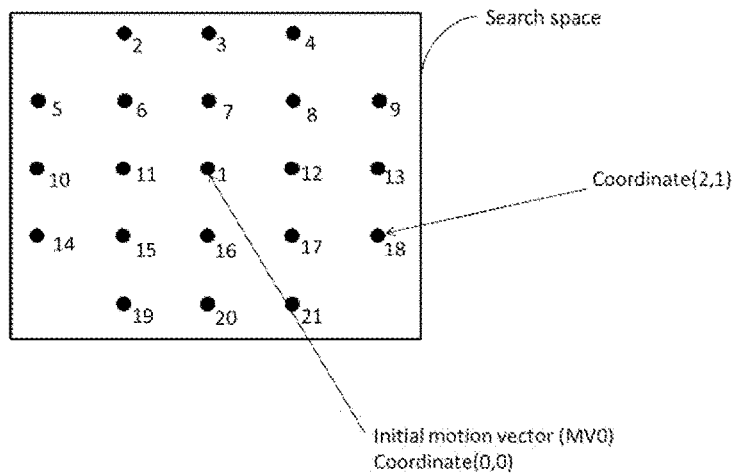
FIG. 9 is another illustration of a checking order.
Figure 10:
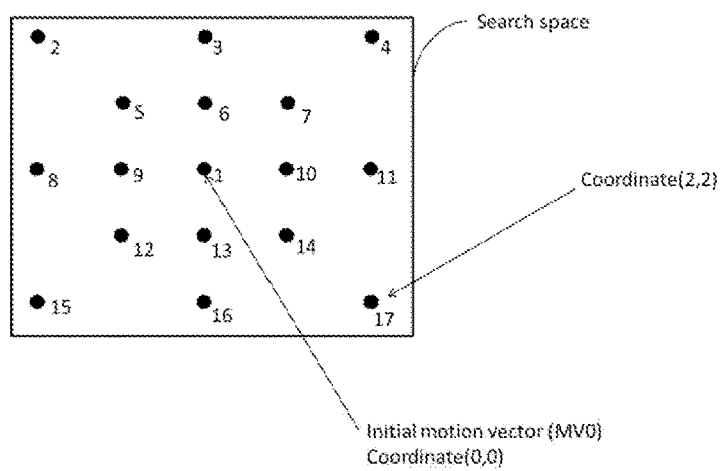
FIG. 10 is another illustration of a checking order.

As shown in FIG. 8, the number of each search space position represents the order of each search space positions according to the checking order, and a position marked with the smaller number is checked earlier than a position marked with the larger number. The position (0, 0) marked as "1" is checked first, then other search space positions in Group II are checked according to a horizontal checking order (from left to right, line by line). Therefore, the checking order is (0, 0), (−2, −2), (−1, −2), (0, −2), (1, −2), (2, −2), (−2, −1), (−1, −1), (0, −1), (1, −1), (2, −1), (−2, 0), (−1, 0), (1, 0), (2, 0), (−2, 1), (−1, 1), (0, 1), (1, 1), (2, 1), (−2, 2), (−1, 2), (0, 2), (1, 2), (2, 2). It is noted that the search space positions in Group II might also be checked according to other checking order, like a vertical checking order (from top to bottom, column by column), a zig-zag checking order and so on. The central position of the search space is checked first, then other search space positions are checked based on a preset checking order. It also can be implemented based on a non-square pattern search space. As an example, it might be a cross-shaped pattern with 21 search space positions, corresponds to a checking order illustrated as FIG. 9. As another example, it might be a Union flag pattern with 17 search space positions, corresponds to a checking order illustrated as FIG. 10.

In a second embodiment, the Group II can be further divided into more groups, for example, the 25 search space positions is divided into four groups:

Group I: (0, 0);
Group II: (−1, 0), (0, 1), (1, 0), (0, −1) (neighboring positions of the central position on vertical or horizontal direction);
Group III: (−1, −1), (−1, 1), (1, 1), (1, −1) (Positions are 1 pixel sample away from the central position and are not comprised in the second group);
Group IV: all other search space positions.

Figure 11:
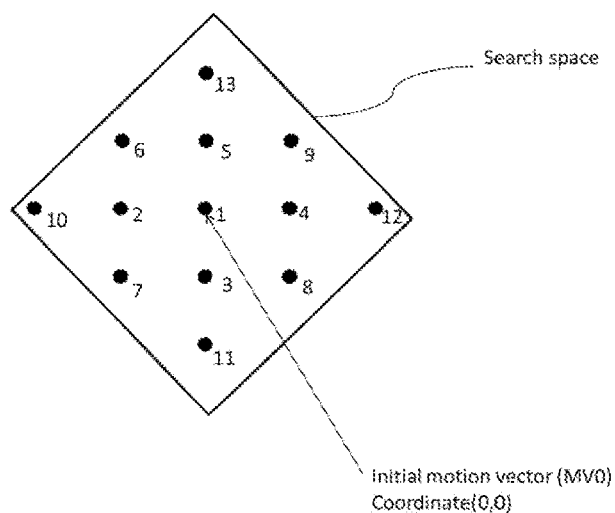
FIG. 11 is another illustration of a checking order.

Group I, II, III and IV are checked in turn. It is noted that the checking order within a same group is not limited, for example, for Group II, the checking order might be (−1, 0), (0, 1), (1, 0), (0, −1) or (−1, 0), (1, 0), (0, 1), (0, −1). It is also noted that the search space positions in Group IV might also be checked according to different checking orders (like clockwise or counterclockwise) and with different starting checking point (like top-left pixel of the search space or other position in Group IV). As an example of FIG. 7, the checking order is (0, 0), (−1, 0), (0, 1), (1, 0), (0, −1), (−1, −1), (−1, 1), (1, 1), (1, −1), (−2, 0), (−2, 1), (−2, 2), (−1, 2), (0, 2), (1, 2), (2, 2), (2, 1), (2, 0), (2, −1), (2, −2), (1, −2), (0, −2), (−1, −2), (−2, −2), (−2, −1). The checking order can also be implemented based on other pattern search space. As an example, it might be a diamond pattern with 13 search space positions, corresponds to a checking order illustrated as FIG. 11.

In a third specific embodiment, the Group IV can be further divided into more groups, for example, the 25 search space positions can be divided into five groups:

Group I: (0, 0);
Group II: (−1, 0), (0, 1), (1, 0), (0, −1) (neighboring positions of the central position on vertical or horizontal direction);
Group III: (−1, −1), (−1, 1), (1, 1), (1, −1) (Positions are 1 pixel sample away from the central position and are not comprised in the second group);
Group IV: (−2, 0), (0, 2), (2, 0), (0, −2) (Positions are 2 pixel samples away from the central position on a vertical/horizontal direction and 0 pixel sample away from the central position on the other horizontal/vertical direction);
Group V: all other search space positions.

Figure 12:
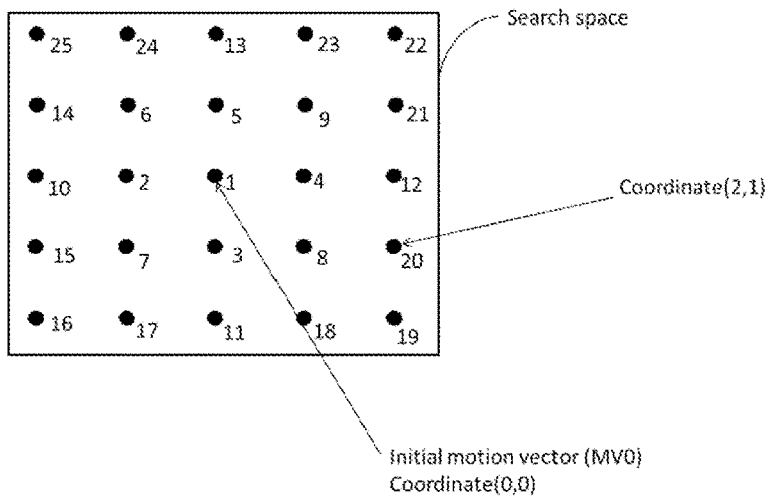
FIG. 12 is another illustration of a checking order.

As shown in FIG. 12, as an example, the checking order is (0, 0), (−1, 0), (0, 1), (1, 0), (0, −1), (−1, −1), (−1, 1), (1, 1), (1, −1), (−2, 0), (0, 2), (2, 0), (0, −2), (−2, −1), (−2, 1), (−2, 2), (−1, 2), (1, 2), (2, 2), (2, 1), (2, −1), (2, −2), (1, −2), (−1, −2), (−2, −2).

In a fourth embodiment, the Group V can be further divided into more groups, for example, the 25 search space positions is divided into six groups:

Group I: (0, 0);
Group II: (−1, 0), (0, 1), (1, 0), (0, −1) (neighboring positions of the central position on vertical or horizontal direction);
Group III: (−1, −1), (−1, 1), (1, 1), (1, −1) (Positions are 1 pixel sample away from the central position and are not comprised in the second group);
Group IV: (−2, 0), (0, 2), (2, 0), (0, −2) (Positions are 2 pixel samples away from the central position on a vertical/horizontal direction and 0 pixel sample away from the central position on the other horizontal/vertical direction);
Group V: (−2, −2), (−2, 2), (2, 2), (2, −2) (Positions are 2 pixel samples away from the central position on both vertical and horizontal direction);
Group VI: all other search space positions.

Figure 13:
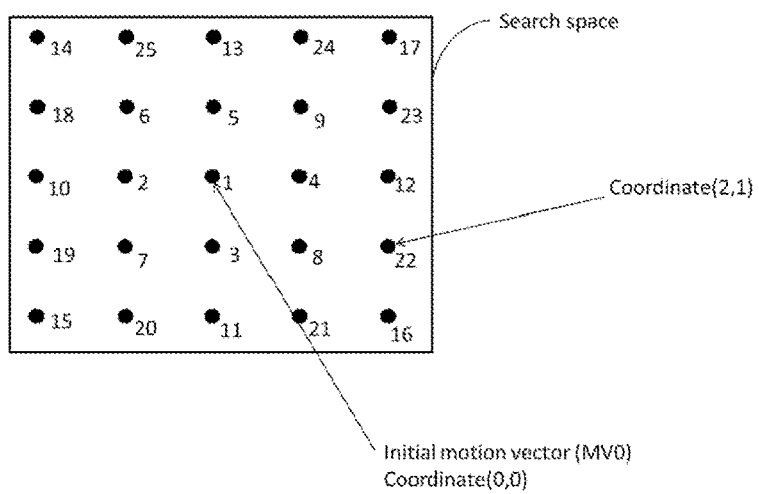
FIG. 13 is another illustration of a checking order.

As shown in FIG. 13, as an example, the checking order is (0, 0), (−1, 0), (0, 1), (1, 0), (0, −1), (−1, −1), (−1, 1), (1, 1), (1, −1), (−2, 0), (0, 2), (2, 0), (0, −2), (−2, −2), (−2, 2), (2, 2), (2, −2), (−2, −1), (−2, 1), (−1, 2), (1, 2), (2, 1), (2, −1), (1, −2), (−1, −2).

Figure 14:
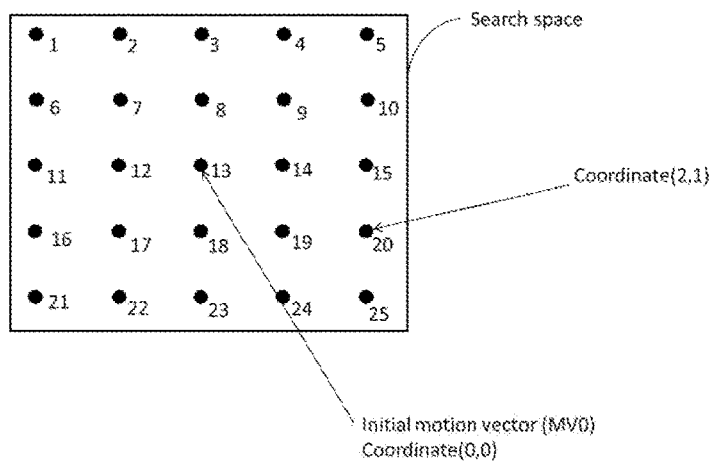
FIG. 14 is another illustration of a checking order.

In a fifth embodiment, the 25 search space positions are not divided. They are checked according to a preset checking order, for example, a horizontal checking order. As shown in FIG. 14, as an example, the checking order is (−2, −2), (−1, −2), (0, −2), (1, −2), (2, −2), (−2, −1), (−1, −1), (0, −1), (1, −1), (2, −1), (−2, 0), (−1, 0), (0, 0), (1, 0), (2, 0), (−2, 1), (−1, 1), (0, 1), (1, 1), (2, 1), (−2, 2), (−1, 2), (0, 2), (1, 2), (2, 2).

S604: Determining a refining motion vector of the current block based on the initial motion vector and the target search space position. A refining motion vector MVO" is a motion vector pointing to the target search space position. And the offset between the target search space position and the central search space position can be derived first, then the refining motion vector MVO" might be also derived by adding the initial motion vector and the offset.

Figure 15:
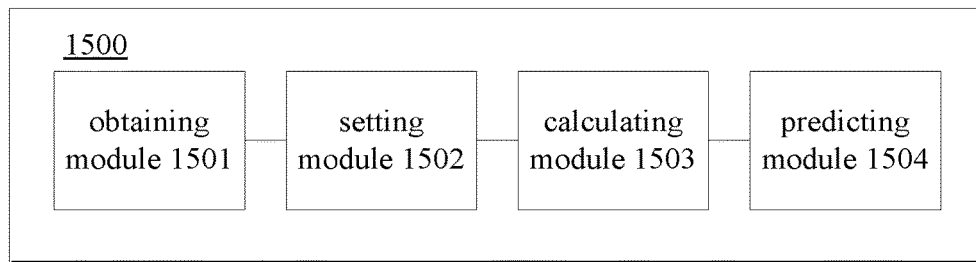
FIG. 15 is a block diagram showing an example of a prediction apparatus configured to implement embodiments of the application.

FIG. 15 shows an inter-prediction apparatus 1500 of the present application. The inter-prediction apparatus 1500, comprising: an obtaining module 1501, configured to obtain an initial motion vector for a current block; a setting module 1502, configured to determine search space positions according to the initial motion vector; a calculating module 1503, configured to check matching costs of the search space positions according to a checking order to select a target search space position with a minimal matching cost; and a prediction module 1504, configured to determine a refining motion vector of the current block based on the initial motion vector and the target search space position, wherein a central search space position is checked first according to the checking order, and wherein the central search space position is pointed to by the initial motion vector.

In an implementation, search space positions comprise the central search positions and neighboring search space positions, wherein the setting module 1502 is configured to determine the central search space position according to the initial motion vector, and determine the neighboring search space positions according to one or more preset offsets and the central search space position.

In an implementation, a search space consists of the search space positions, and a pattern of the search space is a 5×5 search space position square.

In another implementation, the calculating module 1503 is configured to check a matching cost of each of the search space positions in turn according to the checking order, and to select a search space position with the minimal matching cost among the search space positions as the target search space position.

In an implementation, the calculating module 1503 is configured to compare a matching cost of one of the search space positions with a temp minimal matching cost, set the matching cost of the one of the search space positions as the temp minimal matching cost when the matching cost of the one of the search space positions is smaller than the temp minimal matching cost, and to set the temp minimal matching cost as the minimal matching cost after the last one of the search space positions is checked.

In an implementation, the central search space position is set as (0, 0) of a coordinate system, horizontal right is set as a horizontal positive direction and vertical down is set as a vertical positive direction.

In an implementation, the checking order is (0, 0), (−2, −2), (−1, −2), (0, −2), (1, −2), (2, −2), (−2, −1), (−1, −1), (0, −1), (1, −1), (2, −1), (−2, 0), (−1, 0), (1, 0), (2, 0), (−2, 1), (−1, 1), (0, 1), (1, 1), (2, 1), (−2, 2), (−1, 2), (0, 2), (1, 2), (2, 2).

In an implementation, the checking order is (0, 0), (−1, 0), (0, 1), (1, 0), (0, −1), (−1, −1), (−1, 1), (1, 1), (1, −1), (−2, 0), (−2, 1), (−2, 2), (−1, 2), (0, 2), (1, 2), (2, 2), (2, 1), (2, 0), (2, −1), (2, −2), (1, −2), (0, −2), (−1, −2), (−2, −2), (−2, −1).

In an implementation, the checking order is (0, 0), (−1, 0), (0, 1), (1, 0), (0, −1), (−1, −1), (−1, 1), (1, 1), (1, −1), (−2, 0), (0, 2), (2, 0), (0, −2), (−2, −1), (−2, 1), (−2, 2), (−1, 2), (1, 2), (2, 2), (2, 1), (2, −1), (2, −2), (1, −2), (−1, −2), (−2, −2).

In another implementation, the checking order is (0, 0), (−1, 0), (0, 1), (1, 0), (0, −1), (−1, −1), (−1, 1), (1, 1), (1, −1), (−2, 0), (0, 2), (2, 0), (0, −2), (−2, −2), (−2, 2), (2, 2), (2, −2), (−2, −1), (−2, 1), (−1, 2), (1, 2), (2, 1), (2, −1), (1, −2), (−1, −2).

Figure 16:
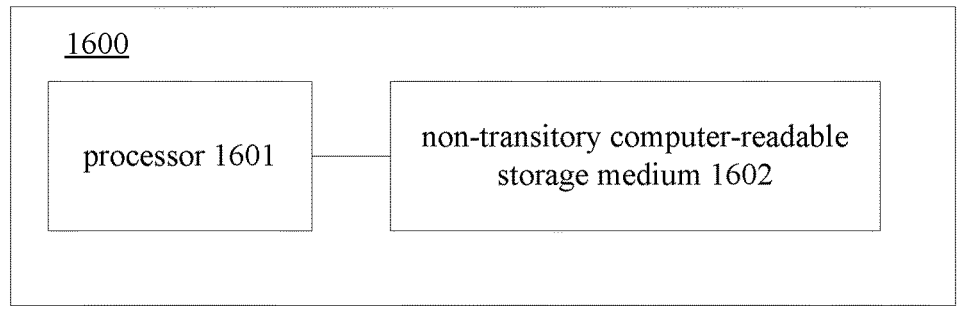
FIG. 16 is a block diagram illustrating an example of an encoding apparatus or a decoding apparatus.

FIG. 16 shows an inter-prediction apparatus 1600 of the present application, the apparatus 1600 may be in the form of a decoder or an encoder. The apparatus 1600 includes one or more processors 1601 and a non-transitory computer-readable storage medium 1602 coupled to the processors and storing programming for execution by the processors, wherein the programming, when executed by the processors, configures the decoder to carry out the method in FIG. 6.

In another embodiment, a computer program product comprising program code for performing the method in FIG. 6 when executed on a computer or a processor.

In another embodiment, a non-transitory computer-readable medium carrying a program code which, when executed by a computer device, causes the computer device to perform the method in FIG. 6.

Following is an explanation of the applications of the encoding method as well as the decoding method as shown in the above-mentioned embodiments, and a system using them.

Figure 17:
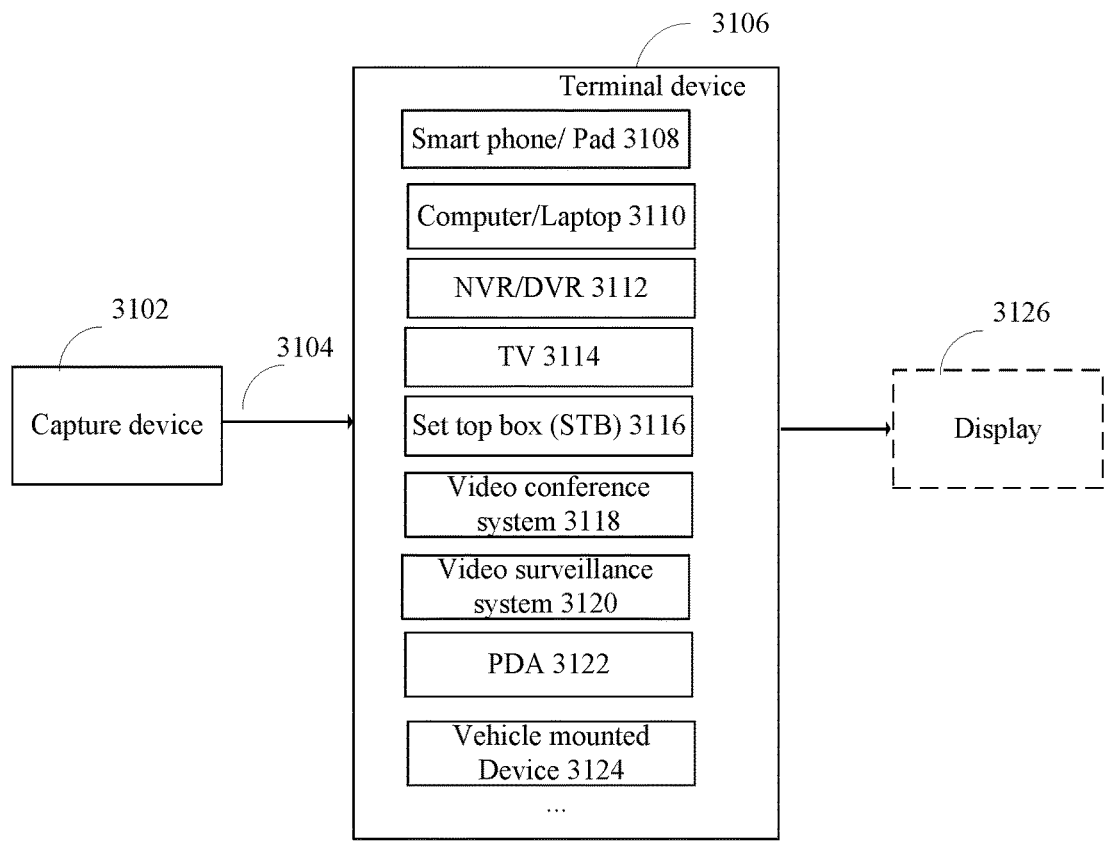
FIG. 17 is a block diagram showing an example structure of a content supply system 3100 which realizes a content delivery service.

FIG. 17 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio such as voice, an audio encoder included in the capture device 3102 may perform audio encoding processing. For some scenarios, the capture device 3102 distributes the encoded video and audio data by multiplexing them together. For other scenarios, for example in the video conference system, the encoded audio data and the encoded video data are not multiplexed. Capture device 3102 separately distributes the encoded audio data and the encoded video data to the terminal device 3106.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display (examples of terminal devices including, for example, smart phone or Pad 3108, computer or laptop 3110, network video recorder (NVR)/digital video recorder (DVR) 3112, TV 3114, personal digital assistant (PDA) 3122, or vehicle mounted device 3124), the terminal device can feed the decoded data to its display. For a terminal device not equipped with no display (examples including STB 3116, video conference system 3118, or video surveillance system 3120), the terminal device can be connected to an external display 3126 to receive and show the decoded data.

When each device in this system performs encoding or decoding, the picture encoding device or the picture decoding device, as shown in the above-mentioned embodiments, might be used.

Figure 18:
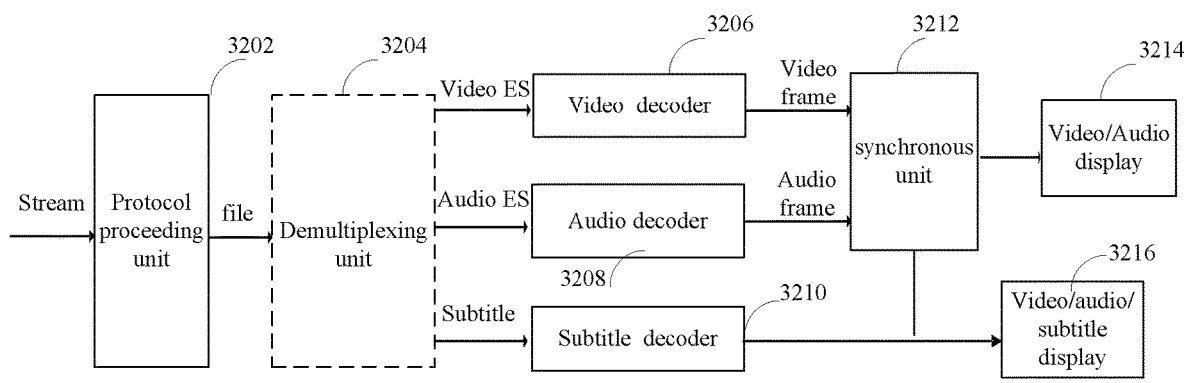
FIG. 18 is a block diagram showing a structure of an example of a terminal device.

FIG. 18 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, a stream file is generated. The stream file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitles are generated. The video decoder 3206, which includes the video decoder 30 as explained in the above-mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 18) before feeding it to the synchronous unit 3212. Similarly, the audio frame may store in a buffer (not shown in FIG. 20) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself. If subtitle is included in the stream, the subtitle decoder 3210 decodes the subtitle, and synchronizes it with the video frame and the audio frame, and supplies the video/audio/subtitle to a video/audio/subtitle display 3216.

The present application is not limited to the above-mentioned system, and either the picture encoding device or the picture decoding device in the above-mentioned embodiments might be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{I=x}^{y} f(i)$$

The summation of f(i) with i taking all integer values from x up to and including y.

Modulus. Remainder of x divided by y, defined only for integers x and y with x >=0 x % y and y>0.

Logical Operators

The following logical operators are defined as follows:
x && y Boolean logical "and" of x and y
x||y Boolean logical "or" of x and y
! Boolean logical "not"
x?y: z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
|Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.

X>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

X<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−=Decrement by amount specified, i.e., x −=3 is equivalent to x=x−3, and x −=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x & ; \quad x >= 0 \\ -x & ; \quad x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right) & ; \quad x > 0 \\ \text{Atan}\left(\frac{y}{x}\right) + \pi & ; \quad x < 0 \,\&\&\, y >= 0 \\ \text{Atan}\left(\frac{y}{x}\right) - \pi & ; \quad x < 0 \,\&\&\, y < 0 \\ +\frac{\pi}{2} & ; \quad x = x == 0 \,\&\&\, y >= 0 \\ -\frac{\pi}{2} & ; \quad \text{otherwise} \end{cases}$$

Ceil(x) the smallest integer greater than or equal to x.

$\text{Clip1}_Y(x) = \text{Clip3}(0, (1(<< \text{BitDepth})_Y) - 1, x)$ $\text{Clip1}_C(x) = \text{Clip3}(0, (1(<< \text{BitDepth})_C) - 1, x)$ $$\text{Clip3}(x, y, z) = \begin{cases} x & ; \quad z < x \\ y & ; \quad z > y \\ z & ; \quad \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d & ; \quad b - a >= d/2 \\ c - d & ; \quad a - b > d/2 \\ c & ; \quad \text{otherwise} \end{cases}$$

Ln(x) the natural logarithm of x (the base-e logarithm, where e is the natural logarithm base constant 2.718 281 828 . . . ).

Log2(x) the base-2 logarithm of x.

Log10(x) the base-10 logarithm of x.

$$\text{Min}(x, y) = \begin{cases} x & ; \quad x <= y \\ y & ; \quad x > y \end{cases}$$

$$\text{Max}(x, y) = \begin{cases} x & ; \quad x >= y \\ y & ; \quad x < y \end{cases}$$

$\text{Round}(x) = \text{Sign}(x) * \text{Floor}(\text{Abs}(x) + 0.5)$ $$\text{Sign}(x) = \begin{cases} 1 & ; \quad x > 0 \\ 0 & ; \quad x == 0 \\ -1 & ; \quad x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
| --- |
| operations (with operands x, y, and z) |
| "x++", "x− −" |
| "!x", "−x" (as a unary prefix operator) |
| $x^y$ |
| "x * y", "x / y", "x ÷ y", "$\frac{x}{y}$", "x % y" |

TABLE-continued

Operation precedence from highest (at top of table) to lowest (at bottom of table)

operations (with operands x, y, and z)

"x + y", "x − y" (as a two-argument operator), $$\sum_{i=x}^{y} f(i)$$

"x << y", "x >> y"
"x < y", "x <= y", "x > y", "x >= y"
"x = = y", "x != y"
"x & y"
"x | y"
"x && y"
"x || y"
"x ? y : z"
"x . . . y"
"x = y", "x += y", "x −= y"

Text Description of Logical Operations

In the text, a statement of logical operations as would be described mathematically in the following form:
  if(condition 0)
    statement 0
  else if(condition 1)
    statement 1
  else /* informative remark on remaining condition */
    statement n
may be described in the following manner:
  . . . as follows/ . . . the following applies:
  If condition 0, statement 0
  Otherwise, if condition 1, statement 1
  . . .
  Otherwise (informative remark on remaining condition), statement n Each "If . . . Otherwise, if . . . Otherwise, . . . "statement in the text is introduced with" . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . "statements might be identified by matching" . . . as follows" or " . . . the following applies" with the ending "Otherwise . . . ".

In the text, a statement of logical operations as would be described mathematically in the following form:
  if(condition 0a && condition 0b)
    statement 0
  else if(condition 1a||condition 1b)
    statement 1
  . . .
  else
    statement n
may be described in the following manner:
  . . . as follows/ . . . the following applies:
  If all of the following conditions are true, statement 0:
    condition 0a
    condition 0b
  Otherwise, if one or more of the following conditions are true, statement 1:
    condition 1a
    condition 1b
  . . .
  Otherwise, statement n In the text, a statement of logical operations as would be described mathematically in the following form:
  if(condition 0)
    statement 0
  if(condition 1)
    statement 1
may be described in the following manner:
  When condition 0, statement 0
  When condition 1, statement 1.

Embodiments of the encoder 20 and the decoder 30, and functions described herein may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that might be accessed by one or more computers or one or more processors to retrieve instructions, code and/or data structures for implementation of the techniques described in this disclosure. A computer program product may include a computer-readable medium.

By way of non-limiting example, such computer-readable storage media can comprise RAM, ROM, EEPROM, CD-ROM or other optical disk storage, magnetic disk storage, or other magnetic storage devices, flash memory, or any other medium that might be used to store desired program code in the form of instructions or data structures and that might be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of Ics (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. An inter-prediction encoding method for a video block, comprising:
    selecting from a list of candidate motion vectors an initial motion vector for a current block using an index;
    determining a plurality of search space positions according to the initial motion vector;
    checking a matching cost for each of the plurality of search space positions according to a checking order;
    selecting from the plurality of search space positions a target search space position having a minimal matching cost;
    determining a refining motion vector for the current block based on the initial motion vector and the target search space position, wherein a central search space position is checked first according to the checking order, the central search space position being pointed to by the initial motion vector; and
    encoding the index into a bitstream.

2. The inter-prediction encoding method of claim 1, the plurality of search space positions comprising the central search position and neighboring search space positions and the determining of search space positions comprising:
    determining the central search space position according to the initial motion vector; and
    determining the neighboring search space positions according to one or more preset offsets and the central search space position.

3. The inter-prediction encoding method of claim 1, further comprising selecting a 5×5 search space position square as a pattern for the search space.

4. The inter-prediction encoding method of claim 1, wherein checking the matching cost of each of the plurality of search space positions comprises:
    comparing a match cost of one of the search space positions with a temp minimal matching cost;
    setting the match cost of the one of the search space positions as the temp minimal matching cost when the match cost of the one of the search space positions is less than the temp minimal matching cost; and
    setting the temp minimal matching cost as the minimal matching cost after the last one of the search space positions has been checked.

5. The inter-prediction encoding method of claim 1, wherein the central search space position is set as (0, 0) of a coordinate system, horizontal right is set as a horizontal positive direction and vertical down is set as a vertical positive direction.

6. The inter-prediction encoding method of claim 1, wherein the checking order is checking search space position (0, 0) before search space position (-2, -2), and checking search space position (-2, -2) before search space position (-1, -2), and checking search space position (-1, -2) before search space position (0, -2), and checking search space position (0, -2) before search space position (1, -2), and checking search space position (1, -2) before search space position (2, -2), and checking search space position (2, -2) before search space position (-2, -1), and checking search space position (-2, -1) before search space position (-1, -1), and checking search space position (-1, -1) before search space position (0, -1), and checking search space position (0, -1) before search space position (1, -1), and checking search space position (1, -1) before search space position (2, -1), and checking search space position (2, -1) before search space position (-2, 0), and checking search space position (-2, 0) before search space position (-1, 0), and checking search space position (-1, 0) before search space position (1, 0), and checking search space position (1, 0) before search space position (2, 0), and checking search space position (2, 0) before search space position (-2, 1), and checking search space position (-2, 1) before search space position (-1, 1), and checking search space position (-1, 1) before search space position (0, 1), and checking search space position (0, 1) before search space position (1, 1), and checking search space position (1, 1) before search space position (2, 1), and checking search space position (2, 1) before search space position (-2, 2), and checking search space position (-2, 2) before search space position (-1, 2), and checking search space position (-1, 2) before search space position (0, 2), and checking search space position (0, 2) before search space position (1, 2), and checking search space position (1, 2) before search space position (2, 2).

7. An inter-prediction decoding method for a video block, comprising:
    parsing an index from a bitstream;
    selecting from a list of candidate motion vectors an initial motion vector for a current block using the index;
    determining a plurality of search space positions according to the initial motion vector;
    checking a matching cost for each of the plurality of search space positions according to a checking order;
    selecting, from the plurality of search space positions, a target search space position having a minimal matching cost; and
    determining a refining motion vector of the current block based on the initial motion vector and the target search space position, a central search space position being checked first according to the checking order, the central search space position being pointed to by the initial motion vector.

8. The inter-prediction decoding method of claim 7, the plurality of search space positions comprising the central search position and neighboring search space positions and the determining of search space positions comprising:
    determining the central search space position according to the initial motion vector; and
    determining the neighboring search space positions according to one or more preset offsets and the central search space position.

9. The inter-prediction decoding method of claim 7, further comprising selecting a 5×5 search space position square as a pattern for the search space.

10. The inter-prediction decoding method of claim 7, wherein the central search space position is set as (0, 0) of a coordinate system, horizontal right is set as a horizontal positive direction and vertical down is set as a vertical positive direction.

11. The inter-prediction decoding method of claim 7, wherein the checking order is checking search space position (0, 0) before search space position (-2, -2), and checking search space position (-2, -2) before search space position (−1, −2), and checking search space position (−1, −2) before search space position (0, −2), and checking search space position (0, −2) before search space position (1, −2), and checking search space position (1, −2) before search space position (2, −2), and checking search space position (2, −2) before search space position (−2, −1), and checking search space position (−2, −1) before search space position (−1, −1), and checking search space position (−1, −1) before search space position (0, −1), and checking search space position (0, −1) before search space position (1, −1), and checking search space position (1, −1) before search space position (2, −1), and checking search space position (2, −1) before search space position (−2, 0), and checking search space position (−2, 0) before search space position (−1, 0), and checking search space position (−1, 0) before search space position (1, 0), and checking search space position (1, 0) before search space position (2, 0), and checking search space position (2, 0) before search space position (−2, 1), and checking search space position (−2, 1) before search space position (−1, 1), and checking search space position (−1, 1) before search space position (0, 1), and checking search space position (0, 1) before search space position (1, 1), and checking search space position (1, 1) before search space position (2, 1), and checking search space position (2, 1) before search space position (−2, 2), and checking search space position (−2, 2) before search space position (−1, 2), and checking search space position (−1, 2) before search space position (0, 2), and checking search space position (0, 2) before search space position (1, 2), and checking search space position (1, 2) before search space position (2, 2).

12. An encoder, comprising:
one or more processors; and
memory coupled to the one or more processors and storing program instructions that, when executed by the one or more processors, cause the encoder to:
select from a list of candidate motion vectors an initial motion vector for a current block using an index;
determine a plurality of search space positions according to the initial motion vector;
check a matching cost for each of the plurality of search space positions according to a checking order;
select from the plurality of search space positions a target search space position having a minimal matching cost;
determine a refining motion vector for the current block based on the initial motion vector and the target search space position, wherein a central search space position is checked first according to the checking order, the central search space position being pointed to by the initial motion vector; and
encode the index into a bitstream.

13. A decoder, comprising:
one or more processors; and
memory coupled to the one or more processors and storing program instructions that, when executed by the one or more processors, cause the decoder to:
parse an index from a bitstream;
select from a list of candidate motion vectors an initial motion vector for a current block using the index;
determine a plurality of search space positions according to the initial motion vector;
check matching costs for each of the plurality of search space positions according to a checking order;
select from the plurality of search space positions a target search space position having a minimal matching cost; and
determine a refining motion vector of the current block based on the initial motion vector and the target search space position, a central search space position being checked first according to the checking order, the central search space position being pointed to by the initial motion vector.

* * * * *